(12) United States Patent
Fugere

(10) Patent No.: US 12,145,170 B1
(45) Date of Patent: *Nov. 19, 2024

(54) MATERIAL DISPENSE TIPS AND METHODS FOR FORMING THE SAME

(71) Applicant: DL Technology, LLC, Haverhill, MA (US)

(72) Inventor: Jeffrey P. Fugere, Hampton Falls, NH (US)

(73) Assignee: DL Technology, LLC., Haverhill, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/228,046

(22) Filed: Jul. 31, 2023

Related U.S. Application Data

(63) Continuation of application No. 17/867,871, filed on Jul. 19, 2022, now Pat. No. 11,738,364, which is a
(Continued)

(51) Int. Cl.
*B05C 11/10* (2006.01)
*B05B 1/02* (2006.01)
(Continued)

(52) U.S. Cl.
CPC .......... *B05C 11/1034* (2013.01); *B05B 1/02* (2013.01); *B05B 7/0466* (2013.01); *B05B 15/65* (2018.02);
(Continued)

(58) Field of Classification Search
CPC .......... B05C 11/1034; B05C 17/00516; B05C 17/00503; B05B 1/02; B05B 15/65;
(Continued)

(56) References Cited

U.S. PATENT DOCUMENTS

| 248,555 | A | 10/1881 | Clarke |
| 537,201 | A | 4/1895 | Haldeman |

(Continued)

FOREIGN PATENT DOCUMENTS

| EP | 0110591 | 6/1984 |
| EP | 0552488 | 7/1993 |
| WO | 0001495 | 1/2000 |

OTHER PUBLICATIONS

"Material Dispense Tips and Methods for Forming the Same" Specification, Drawings, Claims and Prosecution History of U.S. Appl. No. 12/647,911, filed Dec. 28, 2009, by Jeffrey P. Fugere, now issued U.S. Pat. No. 8,864,055, issued Oct. 21, 2014.

(Continued)

*Primary Examiner* — Steven J Ganey
(74) *Attorney, Agent, or Firm* — Onello & Mello, LLP

(57) ABSTRACT

A dispense tip constructed and arranged to communicate with a material dispensing pump comprises an elongated neck and a molded base having a first portion and a second portion opposite the first portion. The neck extends from the first portion of the base. The second portion is constructed and arranged to abut an outlet surface of the pump. An outermost region of the second portion of the base includes a compressible fluid-tight surface that compliantly conforms to the outlet surface when the dispense tip is mounted to the pump.

14 Claims, 10 Drawing Sheets

Related U.S. Application Data continuation of application No. 16/910,397, filed on Jun. 24, 2020, now Pat. No. 11,420,225, which is a continuation of application No. 16/144,086, filed on Sep. 27, 2018, now Pat. No. 10,722,914, which is a continuation of application No. 15/042,388, filed on Feb. 12, 2016, now Pat. No. 10,105,729, which is a continuation of application No. 14/287,714, filed on May 27, 2014, now Pat. No. 9,272,303, which is a continuation of application No. 12/647,911, filed on Dec. 28, 2009, now Pat. No. 8,864,055.

(60) Provisional application No. 61/251,497, filed on Oct. 14, 2009, provisional application No. 61/174,742, filed on May 1, 2009.

(51) Int. Cl.
| | | |
|---|---|---|
| *B05B 7/04* | (2006.01) | |
| *B05B 15/65* | (2018.01) | |
| *B05C 17/005* | (2006.01) | |
| *B29C 65/48* | (2006.01) | |
| *G01F 13/00* | (2006.01) | |
| *B29K 63/00* | (2006.01) | |
| *B29L 31/00* | (2006.01) | |

(52) U.S. Cl.
CPC .. *B05C 17/00503* (2013.01); *B05C 17/00516* (2013.01); *B29C 65/485* (2013.01); *G01F 13/005* (2013.01); *B29K 2063/00* (2013.01); *B29K 2881/00* (2013.01); *B29L 2031/7544* (2013.01); *Y10S 239/12* (2013.01); *Y10S 239/19* (2013.01); *Y10T 29/4943* (2015.01)

(58) Field of Classification Search
CPC . B05B 7/0466; B29C 65/485; B29K 2063/00; B29K 2881/00; B29L 2031/7544
USPC ... 239/1, 390, 391, 419, 432, 589, 600, 602, 239/DIG. 12, DIG. 19; 222/372, 420, 222/427, 567
See application file for complete search history.

(56) References Cited

U.S. PATENT DOCUMENTS

| | | |
|---|---|---|
| 796,256 A | 8/1905 | Conrad |
| 1,038,231 A | 9/1912 | Taylor et al. |
| 1,345,965 A | 7/1920 | Shute |
| 1,397,220 A | 11/1921 | Lord |
| 1,453,161 A | 4/1923 | Murphy et al. |
| 1,458,718 A | 6/1923 | Lord |
| 1,593,016 A | 7/1926 | Campbell |
| 1,699,236 A | 1/1929 | Goldrick |
| 1,730,099 A | 10/1929 | Tribbett |
| 1,745,382 A | 2/1930 | Roger |
| 1,746,604 A | 2/1930 | Piquere |
| 2,054,881 A | 9/1936 | Saunders |
| 2,165,398 A | 7/1939 | Mazzanobile |
| 2,287,716 A | 4/1941 | Whitfield |
| 2,269,823 A | 1/1942 | Kreiselman |
| 2,410,517 A | 11/1946 | Muller et al. |
| 2,506,657 A | 5/1950 | Webster |
| 2,635,016 A | 4/1953 | Doniak |
| 2,656,070 A | 10/1953 | Linder |
| 2,729,364 A | 1/1956 | Malko |
| 2,751,119 A | 6/1956 | Manning, Sr. |
| 2,834,520 A | 5/1958 | Nyden |
| 2,855,929 A | 10/1958 | Hein |
| 2,882,045 A | 4/1959 | Moore |
| 2,901,153 A | 8/1959 | Collins |
| 2,906,492 A | 9/1959 | Conrad |
| 2,933,259 A | 4/1960 | Raskin |
| 3,072,302 A | 1/1963 | Giovannoni et al. |
| 3,330,294 A | 7/1967 | Manning et al. |
| 3,342,205 A | 9/1967 | Quinto |
| 3,344,647 A | 10/1967 | Berger |
| 3,355,766 A | 12/1967 | Causemann |
| 3,379,196 A | 4/1968 | Mitchell |
| 3,394,659 A | 7/1968 | Van |
| 3,425,414 A | 2/1969 | La |
| 3,473,557 A | 10/1969 | Loe |
| 3,507,584 A | 4/1970 | Robbins, Jr. |
| 3,545,479 A | 12/1970 | Winston |
| 3,618,993 A | 11/1971 | Platte |
| 3,693,844 A | 9/1972 | Willeke |
| 3,693,884 A | 9/1972 | Snodgrass et al. |
| 3,732,731 A | 5/1973 | Fussell |
| 3,732,734 A | 5/1973 | Avakian |
| 3,734,635 A | 5/1973 | Blach et al. |
| 3,756,730 A | 9/1973 | Spatz |
| 3,771,476 A | 11/1973 | Heinle |
| 3,790,128 A | 2/1974 | Hempelmann et al. |
| 3,811,601 A | 5/1974 | Reighard et al. |
| 3,865,281 A | 2/1975 | Byrd et al. |
| 3,938,492 A | 2/1976 | Mercer, Jr. |
| 3,945,569 A | 3/1976 | Sperry |
| 3,963,151 A | 6/1976 | North, Jr. |
| 3,963,884 A | 6/1976 | Pollock |
| 3,975,058 A | 8/1976 | York |
| 3,985,032 A | 10/1976 | Avakian |
| 4,004,715 A | 1/1977 | Williams et al. |
| 4,040,875 A | 8/1977 | Noble |
| 4,042,201 A | 8/1977 | O'Callaghan |
| 4,072,330 A | 2/1978 | Brysch |
| 4,077,180 A | 3/1978 | Agent et al. |
| 4,116,766 A | 9/1978 | Poindexter et al. |
| 4,168,942 A | 9/1979 | Firth |
| 4,197,070 A | 4/1980 | Ko |
| 4,239,462 A | 12/1980 | Dach et al. |
| 4,258,862 A | 3/1981 | Thorsheim |
| 4,312,630 A | 1/1982 | Travaglini |
| 4,338,925 A | 7/1982 | Miller |
| 4,339,840 A | 7/1982 | Monson |
| 4,341,329 A | 7/1982 | Kuemmerer et al. |
| 4,346,849 A | 8/1982 | Rood |
| 4,377,894 A | 3/1983 | Yoshida |
| 4,386,483 A | 6/1983 | Schlaefli |
| 4,397,407 A | 8/1983 | Skoupi et al. |
| 4,400,708 A | 8/1983 | Sachs |
| 4,408,699 A | 10/1983 | Stock |
| 4,454,745 A | 6/1984 | Cudini |
| 4,465,212 A | 8/1984 | Boone |
| 4,465,922 A | 8/1984 | Kolibas |
| 4,471,890 A | 9/1984 | Dougherty |
| 4,513,190 A | 4/1985 | Ellett et al. |
| 4,523,741 A | 6/1985 | Chandler |
| 4,572,103 A | 2/1986 | Engel |
| 4,579,286 A | 4/1986 | Stoudt |
| 4,584,964 A | 4/1986 | Engel |
| 4,607,766 A | 8/1986 | Jones |
| 4,610,377 A | 9/1986 | Rasmussen |
| 4,629,099 A | 12/1986 | Jones |
| 4,673,109 A | 6/1987 | Cassia |
| 4,705,218 A | 11/1987 | Daniels |
| 4,705,611 A | 11/1987 | Grimes et al. |
| 4,729,544 A | 3/1988 | Baumann |
| 4,743,243 A | 5/1988 | Vaillancourt |
| 4,763,755 A | 8/1988 | Murray |
| 4,785,996 A | 11/1988 | Ziecker et al. |
| 4,803,124 A | 2/1989 | Kunz |
| 4,836,422 A | 6/1989 | Rosenberg |
| 4,859,073 A | 8/1989 | Howseman, Jr. et al. |
| 4,917,274 A | 4/1990 | Asa et al. |
| 4,919,204 A | 4/1990 | Baker et al. |
| 4,935,015 A | 6/1990 | Hall |
| 4,941,428 A | 7/1990 | Engel |
| 4,969,602 A | 11/1990 | Scholl |
| 4,974,755 A | 12/1990 | Sonntag |
| 5,002,228 A | 3/1991 | Su |
| 5,010,930 A | 4/1991 | Colu |
| 5,052,591 A | 10/1991 | Divall et al. |
| 5,065,910 A | 11/1991 | Fie |

(56) References Cited

U.S. PATENT DOCUMENTS

| | | |
|---|---|---|
| 5,090,814 A | 2/1992 | Petcen |
| 5,106,291 A | 4/1992 | Gellert |
| 5,130,710 A | 7/1992 | Salazar |
| 5,148,946 A | 9/1992 | Mizuta et al. |
| 5,161,427 A | 11/1992 | Fukuda et al. |
| 5,172,833 A | 12/1992 | Faulkner, III |
| 5,176,803 A | 1/1993 | Barbuto et al. |
| 5,177,901 A | 1/1993 | Smith |
| 5,186,886 A | 2/1993 | Zerinvary et al. |
| RE34,197 E | 3/1993 | Engel |
| 5,199,169 A | 4/1993 | Bonzak |
| 5,217,154 A | 6/1993 | Elwood et al. |
| 5,226,625 A | 7/1993 | Hanna |
| 5,236,162 A | 8/1993 | Desjardins |
| 5,261,610 A | 11/1993 | Waryu et al. |
| 5,265,773 A | 11/1993 | Harada |
| 5,287,762 A | 2/1994 | Bonzak |
| 5,344,052 A | 9/1994 | Divall et al. |
| 5,348,453 A | 9/1994 | Baran et al. |
| 5,375,743 A | 12/1994 | Soudan |
| 5,407,101 A | 4/1995 | Hubbard |
| 5,452,824 A | 9/1995 | Danek et al. |
| 5,480,487 A | 1/1996 | Figini et al. |
| 5,535,919 A | 7/1996 | Ganzer et al. |
| 5,553,742 A | 9/1996 | Maruyama et al. |
| 5,564,606 A | 10/1996 | Engel |
| 5,567,300 A | 10/1996 | Datta et al. |
| 5,569,934 A | 10/1996 | Fujii et al. |
| 5,624,045 A | 4/1997 | Highsmith et al. |
| 5,637,815 A | 6/1997 | Takahata et al. |
| 5,685,853 A | 11/1997 | Bonnet |
| 5,699,934 A | 12/1997 | Kolcun et al. |
| 5,765,730 A | 6/1998 | Richter |
| 5,785,068 A | 7/1998 | Sasaki et al. |
| 5,795,390 A | 8/1998 | Cavallaro |
| 5,803,661 A | 9/1998 | Lemelson |
| 5,814,022 A | 9/1998 | Antanavich et al. |
| 5,819,983 A | 10/1998 | White et al. |
| 5,823,747 A | 10/1998 | Ciavarini et al. |
| 5,833,851 A | 11/1998 | Adams et al. |
| 5,837,892 A | 11/1998 | Cavallaro et al. |
| 5,886,494 A | 3/1999 | Prentice et al. |
| 5,894,147 A | 4/1999 | Cacharelis |
| 5,903,125 A | 5/1999 | Prentice et al. |
| 5,904,377 A | 5/1999 | Throup |
| 5,918,648 A | 7/1999 | Carr et al. |
| 5,925,187 A | 7/1999 | Freeman et al. |
| 5,927,560 A | 7/1999 | Lewis et al. |
| 5,931,355 A | 8/1999 | Jefferson |
| 5,947,022 A | 9/1999 | Freeman et al. |
| 5,947,509 A | 9/1999 | Ricks et al. |
| 5,957,343 A | 9/1999 | Cavallaro |
| 5,964,378 A | 10/1999 | Sperry et al. |
| 5,971,227 A | 10/1999 | White et al. |
| 5,984,147 A | 11/1999 | Van Ngo |
| 5,985,029 A | 11/1999 | Purcell |
| 5,985,206 A | 11/1999 | Zabala et al. |
| 5,985,216 A | 11/1999 | Rens et al. |
| 5,988,530 A | 11/1999 | Rockefeller |
| 5,992,688 A | 11/1999 | Lewis et al. |
| 5,992,698 A | 11/1999 | Copeland et al. |
| 5,992,704 A | 11/1999 | Reinho |
| 5,993,183 A | 11/1999 | Laskaris et al. |
| 5,993,518 A | 11/1999 | Tateyama |
| 5,995,788 A | 11/1999 | Baek |
| 6,007,631 A | 12/1999 | Prentice et al. |
| 6,017,392 A | 1/2000 | Cavallaro |
| 6,025,689 A | 2/2000 | Prentice et al. |
| 6,068,202 A | 5/2000 | Hynes et al. |
| 6,082,289 A | 7/2000 | Cavallaro |
| 6,085,943 A | 7/2000 | Cavallaro et al. |
| 6,088,892 A | 7/2000 | Bertsch et al. |
| 6,093,251 A | 7/2000 | Carr et al. |
| 6,112,588 A | 9/2000 | Cavallaro et al. |
| 6,119,566 A | 9/2000 | Yan et al. |
| 6,119,895 A | 9/2000 | Fugere et al. |
| 6,123,167 A | 9/2000 | Miller et al. |
| 6,126,039 A | 10/2000 | Cline et al. |
| 6,132,396 A | 10/2000 | Antanavich et al. |
| 6,157,157 A | 12/2000 | Prentice et al. |
| 6,193,783 B1 | 2/2001 | Sakamoto et al. |
| 6,196,477 B1 | 3/2001 | Halltorp et al. |
| 6,196,521 B1 | 3/2001 | Hynes et al. |
| 6,199,566 B1 | 3/2001 | Gazewood |
| 6,206,964 B1 | 3/2001 | Purcell et al. |
| 6,207,220 B1 | 3/2001 | Doyle et al. |
| 6,214,117 B1 | 4/2001 | Prentice et al. |
| 6,216,917 B1 | 4/2001 | Crouch |
| 6,224,671 B1 | 5/2001 | Cavallaro |
| 6,224,675 B1 | 5/2001 | Prentice et al. |
| 6,234,358 B1 | 5/2001 | Romine et al. |
| 6,234,858 B1 | 5/2001 | Nix |
| 6,250,515 B1 | 6/2001 | Newbold et al. |
| 6,253,957 B1 | 7/2001 | Messerly et al. |
| 6,253,972 B1 | 7/2001 | Devito et al. |
| 6,257,444 B1 | 7/2001 | Everett |
| 6,258,165 B1 | 7/2001 | Cavallaro |
| 6,291,016 B1 | 9/2001 | Donges et al. |
| 6,299,031 B1 | 10/2001 | Cavallaro et al. |
| 6,299,078 B1 | 10/2001 | Fugere |
| 6,311,740 B1 | 11/2001 | Sperry et al. |
| 6,322,854 B1 | 11/2001 | Purcell et al. |
| 6,324,973 B2 | 12/2001 | Rossmeisl et al. |
| 6,354,471 B2 | 3/2002 | Fujii |
| 6,371,339 B1 | 4/2002 | White et al. |
| 6,378,737 B1 | 4/2002 | Cavallaro et al. |
| 6,383,292 B1 | 5/2002 | Brand et al. |
| 6,386,396 B1 | 5/2002 | Strecker |
| 6,391,378 B1 | 5/2002 | Carr et al. |
| 6,395,334 B1 | 5/2002 | Prentice et al. |
| 6,412,328 B1 | 7/2002 | Cavallaro et al. |
| 6,428,852 B1 | 8/2002 | Pillion et al. |
| 6,450,416 B1 | 9/2002 | Berg et al. |
| 6,453,810 B1 | 9/2002 | Rossmeisl et al. |
| 6,511,301 B1 | 1/2003 | Fugere |
| 6,514,569 B1 | 2/2003 | Crouch |
| 6,540,832 B2 | 4/2003 | Cavallaro |
| 6,541,063 B1 | 4/2003 | Prentice et al. |
| 6,547,167 B1 | 4/2003 | Fugere |
| 6,562,406 B1 | 5/2003 | Chikahisa et al. |
| 6,581,906 B2 | 6/2003 | Pott et al. |
| 6,609,902 B1 | 8/2003 | Blais et al. |
| 6,619,198 B2 | 9/2003 | Rossmeisl et al. |
| 6,626,097 B2 | 9/2003 | Rossmeisl et al. |
| 6,644,517 B2 | 11/2003 | Thiel et al. |
| 6,719,174 B1 | 4/2004 | Swift |
| 6,729,507 B2 | 5/2004 | Nagahata et al. |
| 6,736,900 B2 | 5/2004 | Isogai et al. |
| 6,739,483 B2 | 5/2004 | White et al. |
| 6,775,879 B2 | 8/2004 | Bibeault et al. |
| 6,803,661 B2 | 10/2004 | Thakar et al. |
| 6,828,167 B2 | 12/2004 | Kim |
| 6,832,733 B2 | 12/2004 | Engel |
| 6,851,923 B1 | 2/2005 | Fugere |
| 6,866,881 B2 | 3/2005 | Prentice et al. |
| 6,886,720 B2 | 5/2005 | Penn |
| 6,892,959 B1 | 5/2005 | Fugere |
| 6,896,202 B1 | 5/2005 | Fugere |
| 6,957,783 B1 | 10/2005 | Fugere |
| 6,981,664 B1 | 1/2006 | Fugere |
| 6,983,867 B1 | 1/2006 | Fugere |
| 6,994,234 B2 | 2/2006 | De Leeuw |
| 7,000,853 B2 | 2/2006 | Fugere |
| 7,018,477 B2 | 3/2006 | Engel |
| 7,028,867 B2 | 4/2006 | Acum et al. |
| 7,128,731 B2 | 10/2006 | Aramata et al. |
| 7,176,746 B2 | 2/2007 | Wang et al. |
| 7,178,745 B1 | 2/2007 | Fugere |
| 7,190,891 B2 | 3/2007 | Verrilli |
| 7,207,498 B1 | 4/2007 | Fugere |
| 7,231,716 B2 | 6/2007 | Verilli |
| 7,293,691 B2 | 11/2007 | Rossmeisl et al. |
| 7,325,994 B2 | 2/2008 | Liberatore |
| 7,331,482 B1 | 2/2008 | Fugere |

(56) References Cited

U.S. PATENT DOCUMENTS

| | | | |
|---|---|---|---|
| RE40,539 E | 10/2008 | Fugere | |
| 7,434,753 B2 | 10/2008 | Verrilli | |
| 7,448,857 B1 | 11/2008 | Fugere | |
| 7,614,529 B2 | 11/2009 | Bolyard, Jr. et al. | |
| 7,677,417 B2 | 3/2010 | Leiner et al. | |
| 7,694,857 B1 | 4/2010 | Fugere | |
| 7,744,022 B1 | 6/2010 | Fugere | |
| 7,753,253 B2 * | 7/2010 | Terada | H01L 21/563 222/380 |
| 7,762,088 B2 | 7/2010 | Fiske et al. | |
| 7,762,480 B1 | 7/2010 | Fugere | |
| 7,874,456 B2 | 1/2011 | Bolyard, Jr. et al. | |
| 7,905,945 B1 | 3/2011 | Fugere | |
| 7,997,446 B2 | 8/2011 | Engel | |
| 8,056,833 B1 | 11/2011 | Fugere | |
| 8,152,428 B2 | 4/2012 | Rowe et al. | |
| 8,197,582 B1 | 6/2012 | Fugere | |
| 8,220,669 B1 | 7/2012 | Fugere | |
| 8,220,699 B2 | 7/2012 | Dong et al. | |
| 8,240,335 B1 | 8/2012 | Broberg et al. | |
| 8,281,963 B2 | 10/2012 | Liu | |
| 8,353,429 B2 | 1/2013 | Zhou et al. | |
| 8,448,818 B2 | 5/2013 | Ikushima | |
| 8,480,015 B1 | 7/2013 | Fugere | |
| 8,561,842 B2 | 10/2013 | Pizzacalla et al. | |
| 8,690,084 B1 | 4/2014 | Fugere | |
| 8,701,946 B1 | 4/2014 | Fugere | |
| 8,707,559 B1 | 4/2014 | Fugere | |
| 8,710,946 B2 | 4/2014 | Pintgen et al. | |
| 8,864,055 B2 | 10/2014 | Fugere | |
| 9,108,215 B1 | 8/2015 | Fugere | |
| 9,180,482 B1 | 11/2015 | Fu | |
| 9,228,582 B1 | 1/2016 | Fugere | |
| 9,242,770 B2 | 1/2016 | Fugere | |
| 9,272,303 B1 | 3/2016 | Fugere | |
| 9,486,830 B1 | 11/2016 | Fugere | |
| 9,573,156 B1 | 2/2017 | Fugere | |
| 9,725,225 B1 | 8/2017 | Fugere | |
| 9,833,807 B2 | 12/2017 | Fugere | |
| 9,833,808 B1 | 12/2017 | Fugere | |
| 10,105,729 B1 | 10/2018 | Fugere | |
| 10,370,172 B1 | 8/2019 | Fugere | |
| 10,583,454 B1 | 3/2020 | Fugere | |
| 10,722,914 B1 | 7/2020 | Fugere | |
| 10,814,344 B1 | 10/2020 | Fugere | |
| 11,035,412 B2 | 6/2021 | Risko Cattell et al. | |
| 11,059,654 B1 | 7/2021 | Fugere | |
| 11,292,025 B1 | 4/2022 | Fugere | |
| 11,364,517 B1 | 6/2022 | Fugere | |
| 11,370,596 B1 | 6/2022 | Fugere | |
| 11,420,225 B1 | 8/2022 | Fugere | |
| 11,648,581 B1 | 5/2023 | Fugere | |
| 11,738,364 B1 | 8/2023 | Fugere | |
| 11,746,656 B1 | 9/2023 | Fugere | |
| 2001/0011506 A1 | 8/2001 | Rossmeisl et al. | |
| 2001/0020629 A1 | 9/2001 | Fujii | |
| 2001/0020787 A1 | 9/2001 | Pott et al. | |
| 2002/0007227 A1 | 1/2002 | Prentice et al. | |
| 2002/0007741 A1 | 1/2002 | Rossmeisl et al. | |
| 2002/0008118 A1 | 1/2002 | Cavallaro | |
| 2002/0020350 A1 | 2/2002 | Prentice et al. | |
| 2002/0084290 A1 | 7/2002 | Materna | |
| 2002/0088269 A1 | 7/2002 | Cavallaro et al. | |
| 2003/0000462 A1 | 1/2003 | Prentice et al. | |
| 2003/0038190 A1 | 2/2003 | Newbold et al. | |
| 2003/0066546 A1 | 4/2003 | Bibeault et al. | |
| 2003/0071149 A1 | 4/2003 | Verilli | |
| 2003/0084845 A1 | 5/2003 | Prentice et al. | |
| 2003/0091727 A1 | 5/2003 | Prentice et al. | |
| 2003/0097941 A1 | 5/2003 | Rossmeisl et al. | |
| 2003/0125671 A1 | 7/2003 | Aramata et al. | |
| 2003/0132243 A1 | 7/2003 | Engel | |
| 2003/0132443 A1 | 7/2003 | Kim | |
| 2003/0155384 A1 | 8/2003 | Nagahata et al. | |
| 2004/0089228 A1 | 5/2004 | Prentice et al. | |
| 2004/0140371 A1 | 7/2004 | Engel | |
| 2004/0142099 A1 | 7/2004 | Rossmeisl et al. | |
| 2004/0195278 A1 | 10/2004 | De Leeuw | |
| 2004/0245673 A1 | 12/2004 | Allsop | |
| 2004/0262824 A1 | 12/2004 | Andersson et al. | |
| 2005/0072815 A1 | 4/2005 | Carew et al. | |
| 2005/0095365 A1 | 5/2005 | Acum et al. | |
| 2005/0100457 A1 | 5/2005 | Fugere | |
| 2005/0103886 A1 | 5/2005 | Verrilli | |
| 2005/0135869 A1 | 6/2005 | Liberatore | |
| 2005/0158042 A1 | 7/2005 | Verrilli | |
| 2006/0037972 A1 | 2/2006 | Leiner et al. | |
| 2006/0157517 A1 | 7/2006 | Fiske et al. | |
| 2006/0278666 A1 | 12/2006 | Wang et al. | |
| 2007/0145164 A1 | 6/2007 | Ahmadi et al. | |
| 2007/0267450 A1 | 11/2007 | Bolyard, Jr. et al. | |
| 2008/0273938 A1 | 11/2008 | Rowe et al. | |
| 2009/0095825 A1 | 4/2009 | Ahmadi et al. | |
| 2009/0266840 A1 | 10/2009 | Brand et al. | |
| 2010/0065306 A1 | 3/2010 | Pintgen et al. | |
| 2010/0276522 A1 | 11/2010 | Fugere | |
| 2010/0294810 A1 | 11/2010 | Ikushima | |
| 2011/0095056 A1 | 4/2011 | Liu | |
| 2011/0315906 A1 | 12/2011 | Ohuchi et al. | |
| 2012/0048888 A1 | 3/2012 | Pizzacalla et al. | |
| 2013/0105597 A1 | 5/2013 | Dunlap et al. | |
| 2014/0319402 A1 | 10/2014 | Gatten | |
| 2016/0082468 A1 | 3/2016 | Fugere | |
| 2020/0109746 A1 | 4/2020 | Risko Cattell et al. | |

OTHER PUBLICATIONS

"Material Dispense Tips and Methods for Forming the Same" Specification, Drawings, Claims and Prosecution History of U.S. Appl. No. 14/287,714, filed May 27, 2014, by Jeffrey P. Fugere, now issued U.S. Pat. No. 9,272,303, issued Mar. 1, 2016.

"Material Dispense Tips and Methods for Forming the Same" Specification, Drawings, Claims and Prosecution History of U.S. Appl. No. 15/042,388, filed Feb. 12, 2016, now issued U.S. Pat. No. 10,105,729, issued Oct. 23, 2018, by Jeffrey P. Fugere.

"Material Dispense Tips and Methods for Forming the Same" Specification, Drawings, Claims and Prosecution History of U.S. Appl. No. 16/144,086, filed Sep. 27, 2018, by Jeffrey P. Fugere, now issued U.S. Pat. No. 10,722,914, issued Jul. 28, 2020.

"Material Dispense Tips and Methods for Forming the Same" Specification, Drawings, Claims and Prosecution History of U.S. Appl. No. 16/910,397, filed Jun. 24, 2020, by Jeffrey P. Fugere, now issued U.S. Pat. No. 11,420,225, issued Aug. 23, 2022.

Karassik, et al., "Pump Hand Book" Second Ed., McGraw Hill Inc., 1986, p. 9.30.

Micro-Mechanics Design Specifications, May 1999.

Nordson EFD, "736HPA-NV High Pressure Dispense Valve Installation Guide", Jan. 2011.

Sela, Uri, et al., "Dispensing Technology: The Key to High-Quality, High-Speed, Die-Bonding", Microelectronics Manufacturing Technology, Feb. 1991.

Techon Systems, "Local Dispensing Solutions Worldwide: Dispensing Adhesives Material Can Be Challenging", downloaded from the internet on Nov. 4, 2011 (http://www.techconsystems.com/dispensing-adhesives).

Ulrich, Rene, "Epoxy Die Attach: The Challenge of Big Chips", Semiconductor International, Oct. 1994.

"Material Dispense Tips and Methods for Forming the Same" Specification, Drawings, Claims and Prosecution History of U.S. Appl. No. 17/867,871, filed Jul. 19, 2022, by Jeffrey P. Fugere, now issued U.S. Pat. No. 11,738,364, issued Aug. 29, 2023.

* cited by examiner

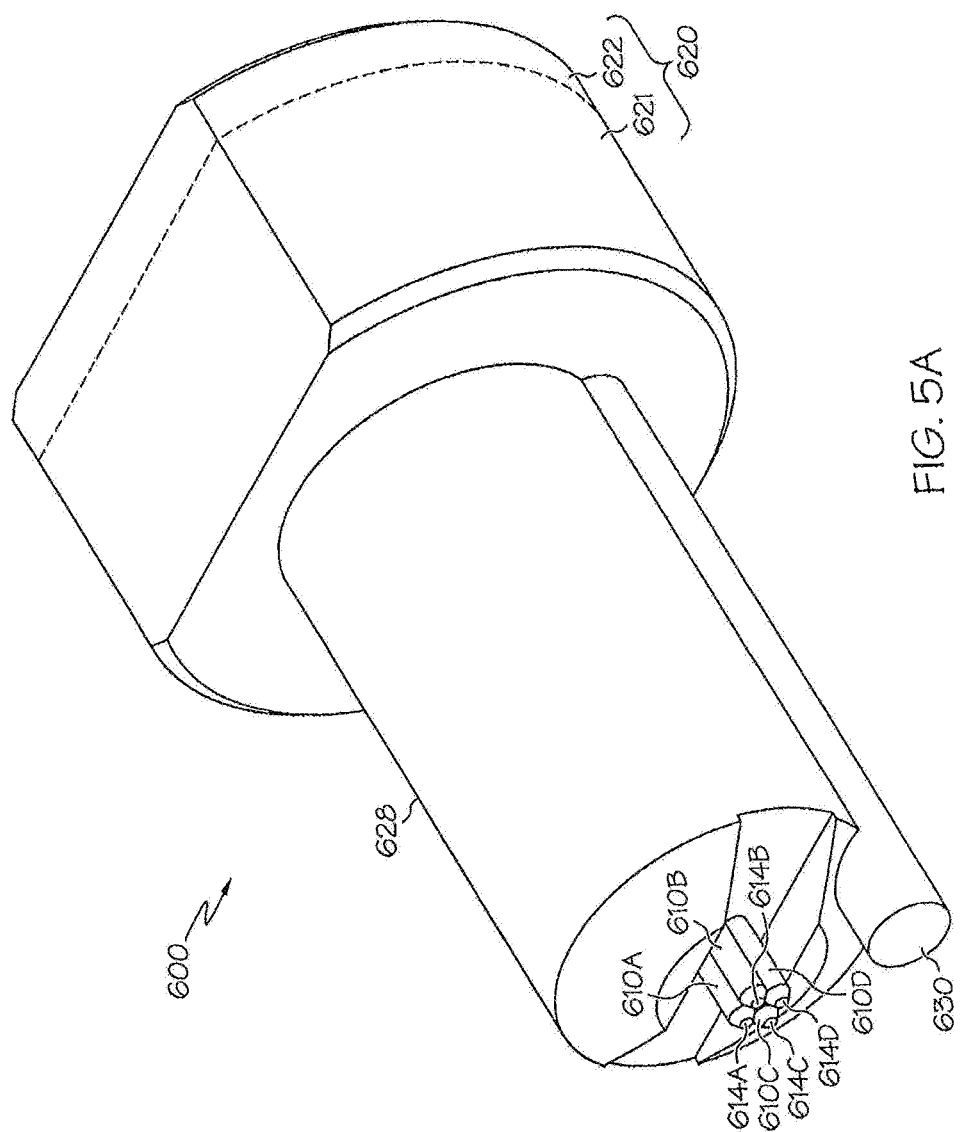

MATERIAL DISPENSE TIPS AND METHODS FOR FORMING THE SAME

RELATED APPLICATIONS

This application is a continuation application of U.S. patent application Ser. No. 17/867,871, filed Jul. 19, 2022, which is a continuation application of U.S. patent application Ser. No. 16/910,397, filed Jun. 24, 2020, and issued as U.S. Pat. No. 11,420,225, which is a continuation application of U.S. patent application Ser. No. 16/144,086, filed Sep. 27, 2018, and issued as U.S. Pat. No. 10,722,914, which is a continuation application of U.S. patent application Ser. No. 15/042,388, filed Feb. 12, 2016, and issued as U.S. Pat. No. 10,105,729, which is a continuation application of U.S. patent application Ser. No. 14/287,714, filed May 27, 2014 and issued as U.S. Pat. No. 9,272,303, which is a continuation application of U.S. patent application Ser. No. 12/647,911, filed Dec. 28, 2009 and issued as U.S. Pat. No. 8,864,055, which claims the benefit of U.S. Provisional Patent Application No. 61/174,742 filed on May 1, 2009 and U.S. Provisional Patent Application No. 61/251,497 filed on Oct. 14, 2009, the entire contents of each of which are incorporated herein by reference.

BACKGROUND OF THE INVENTION

A material dispense tip, also referred to as a "pin" or "needle," is utilized in a variety of applications. For example, a material dispense tip, when attached to a material dispensing pump system, is used to deposit a precise amount of fluid material, such as glue, resin, or paste, at precise positions on a semiconductor substrate. Examples of such material dispensing pumps are described in U.S. Pat. No. 6,511,301, United States Patent No. RE 40,539, U.S. Pat. Nos. 6,892,959, 6,983,867, and 7,331,482, the contents of each of which are incorporated herein by reference in their entirety.

A material dispense tip can be formed according to one of several different approaches. In one approach, a dispense tip can be formed by machining a first stock to form a cylindrical neck, machining a second stock to form a cylindrical base, boring a first hole in the base, inserting the neck into the hole in the base, and forming a second hole through the base and neck.

In another approach, the neck and the base can be unitary and machined from a common stock, for example, stainless steel, or the neck and the base can be molded from ceramics.

In another approach, the neck and the base can each be formed by different methods, and of different materials. For example, the dispense tip can include a molded ceramic neck that is attached to a machined steel base.

The dispense tip can be attached to a material dispensing pump by inserting the base into a cavity in the pump. The base is held in place in the cavity, for example, by a female Luer™-style fitting, which can interface with a corresponding male Luer™-style fitting on the pump. The dispense tip can alternatively be "surface mounted" to a pump, wherein the base of the dispense tip is held in place against an outlet surface of the pump by a nut or other retaining device.

However, when conventional dispense tips are attached to a material dispensing pump, fluid material can leak from an interface between the base of the dispense tip and the pump due to the presence of imperfections such as nicks, cracks, burrs, protrusions, blemishes, dents, or other imperfections on the interfacing surface of the base or on the pump surface against which the base abuts.

Also, a high solvent content may be included in the fluid material to be dispensed in order to prevent the fluid material from coagulating, congealing, drying up and the like in the material path of the dispense tip and the pump. However, these solvents can leach from the material and escape from cracks or crevices in the interfacing surface of the dispense tip, causing the material to dry up and clog the material path. Such solvents may also permeate the feed tube of the material dispense pump or the wall of the dispense tip, depending on the material used to form the dispense tip. For example, in a case where polypropylene or silicone materials are employed to form the dispense tip, certain solvents can permeate these materials.

The base of a conventional dispense tip can be formed by machining plastics. These plastics can be highly stable, possess favorable hardness properties, be resilient to solvents, and adhere to molded necks, such as ceramic necks, using adhesives such as two-part epoxy. In addition, the base comprising such plastics can be machined to close tolerances. However, when machining these plastics from a stock, it is difficult to deburr the finished base from the stock, which can impede the flow of material in the material path formed by holes in the base and neck, or can clog the dispense tip. Further, these plastics have high viscosity properties, which are undesirable for precision micromolding, since such plastics can be prone to imperfections when filling a mold during the molding process for forming the dispense tips.

SUMMARY OF THE INVENTION

Embodiments of the present invention are directed to material dispense tips and methods of forming the same, which overcome the limitations associated with the aforementioned approaches. Embodiments are further directed to dispense pump cartridges and dispense pump systems employing such material dispense tips and methods of forming the same.

In accordance with one aspect, a dispense tip constructed and arranged to communicate with a material dispensing pump comprises an elongated neck and a molded base having a first portion and a second portion opposite the first portion, the second portion having a same width as the first portion, the neck extending from the first portion of the base, the second portion constructed and arranged to abut an outlet surface of the pump, an outermost region of the second portion of the base including a compressible fluid-tight surface that compliantly conforms to the outlet surface when the dispense tip is mounted to the pump. In an embodiment, the neck comprises molded materials. In an embodiment, the neck comprises ceramics. In an embodiment, the neck comprises stainless steel.

In an embodiment, the second portion of the base comprises polyarylene sulfide. In an embodiment, the polyarylene sulfide is polyphenylene sulfide. In an embodiment, the polyphenylene sulfide is linear and partially crystalline.

In an embodiment, the first and second portions of the base comprise polyarylene sulfide.

In an embodiment, the base is coupled to the neck by bonding the base to the neck with a bonding material.

In an embodiment, the bonding material includes a two-part epoxy.

In an embodiment, the dispense tip is constructed and arranged to communicate with a fixed-z material dispensing pump. In an embodiment, the dispense tip is constructed and arranged to communicate with a fixed-z material dispensing pump.

In an embodiment, the neck comprises an elongated hole that extends from an input end of the neck to an output end of the neck and an inner taper between the input end of the neck and the output end of the neck that transitions the input end to the output end. In an embodiment, a portion of the elongated hole has an inner surface of a first inner diameter and the output end includes an outlet having an inner surface of a second inner diameter, the first inner diameter being greater than the second inner diameter.

In an embodiment, the base includes a funnel that delivers fluid to the neck, the funnel having a funnel inlet at an input end of the funnel and a funnel outlet at an output end of the funnel, wherein the neck communicates with the funnel outlet such that the dispense tip includes a single material path between the funnel outlet and an output end of the neck.

In an embodiment, dispense tip further comprises an alignment foot coupled to the base, the foot having a primary axis substantially parallel to a longitudinal axis of the neck, and being of a length longer than the neck.

In an embodiment, the dispense tip further comprises a plurality of elongated necks, each neck coupled to the first portion of the base, the base including a single funnel, each neck including a hole having a single input end and a single output end, the input end communicating with the funnel such that each neck includes a single fluid path between the funnel and the output end of the neck.

In accordance with another aspect, a dispense tip constructed and arranged to communicate with a material dispensing pump comprises an elongated neck and a base coupled to the neck, the base including a compressible surface such that a fluid-tight interface can be formed between the compressible surface of the base and the pump by compliantly conforming the base to the pump when the dispense tip is mounted to the pump, wherein the compressible surface of the base comprises polyarylene sulfide.

In an embodiment, the polyarylene sulfide is polyphenylene sulfide. In an embodiment, the polyphenylene sulfide is linear and partially crystalline.

In an embodiment, the base has a first portion and a second portion opposite the first portion, the neck extending from the first portion of the base, the second portion comprising the compressible surface. In an embodiment, the first and second portions have a same width. In an embodiment, the first and second portions of the base comprise polyarylene sulfide.

In an embodiment, the dispense tip is constructed and arranged to communicate with a fixed-z material dispensing pump. In an embodiment, the dispense tip is constructed and arranged to communicate with a floating-z material dispensing pump In an embodiment, the neck comprises an elongated hole that extends from an input end of the neck to an output end of the neck and an inner taper between the input end of the neck and the output end of the neck that transitions the input end to the output end. In an embodiment, a portion of the elongated hole has an inner surface of a first inner diameter and the output end includes an outlet having an inner surface of a second inner diameter, the first inner diameter being greater than the second inner diameter.

In an embodiment, the base includes a funnel that delivers fluid to the neck, the funnel having a funnel inlet at an input end of the funnel and a funnel outlet at an output end of the funnel, wherein the neck communicates with the funnel outlet such that the dispense tip includes a single material path between the funnel outlet and an output end of the neck.

In an embodiment, the dispense tip comprises an alignment foot coupled to the base, the foot having a primary axis substantially parallel to a longitudinal axis of the neck, and being of a length longer than the neck.

In an embodiment, the dispense tip comprises a plurality of elongated necks, each neck coupled to the first portion of the base, the base including a single funnel, each neck including a hole having a single input end and a single output end, the input end communicating with the funnel such that each neck includes a single fluid path between the funnel and the output end of the neck.

In accordance with another aspect, a material dispensing system comprises a material dispensing pump comprising an inlet that receives a source of material and an outlet, wherein the material dispensing pump outputs the material from the inlet to the outlet; and a dispense tip compliantly conforming to a surface of the outlet of the material dispensing pump. The dispense tip comprises an elongated neck and a molded base having a first portion and a second portion opposite the first portion, the second portion having a same width as the first portion, the neck extending from the first portion of the base, the second portion constructed and arranged to abut an outlet surface of the pump, an outermost region of the second portion of the base including a compressible fluid-tight surface that compliantly conforms to the outlet surface.

In an embodiment, the neck comprises molded materials. In an embodiment, the neck comprises ceramics. In an embodiment, the neck comprises stainless steel.

In an embodiment, the second portion of the base comprises polyarylene sulfide. In an embodiment, the polyarylene sulfide is polyphenylene sulfide. In an embodiment, the polyphenylene sulfide is linear and partially crystalline.

In an embodiment, the first and second portions of the base comprise polyarylene sulfide.

In an embodiment, the material dispensing system is a fixed-z pump system. In an embodiment, the material dispensing system is a floating-z pump system.

In an embodiment, the dispense tip further comprises an alignment foot coupled to the base, the foot having a primary axis substantially parallel to a longitudinal axis of the neck, and being of a length longer than the neck.

In an embodiment, the dispense tip further comprises a plurality of elongated necks, each neck coupled to the first portion of the base, the base including a single funnel, each neck including a hole having a single input end and a single output end, the input end communicating with the funnel such that each neck includes a single fluid path between the funnel and the output end of the neck.

In an embodiment, the pump includes a cartridge, the outlet at a distal end of the cartridge, and the cartridge further comprises a feed screw that delivers the material from the pump from the inlet to the outlet.

In an embodiment, the material dispensing system comprises a retainer nut that holds the dispense tip in place against the outlet surface.

In an embodiment, the material dispensing system comprises an alignment tab that extends from the pump, and wherein a portion of the base includes a flat surface that abuts the alignment tab.

In accordance with another aspect, a material dispensing system comprises a material dispensing pump comprising an inlet that receives a source of material and an outlet, wherein the material dispensing pump outputs the material from the inlet to the outlet; and a dispense tip compliantly conforming to a surface of the outlet of the material dispensing pump, the dispense tip comprising: an elongated neck; and a base coupled to the neck, the base including a compressible surface such that a fluid-tight interface can be formed between the compressible surface of the base and the pump by compliantly conforming the base to the pump when the dispense tip is mounted to the pump, wherein the compressible surface of the base comprises polyarylene sulfide.

In an embodiment, the polyarylene sulfide is polyphenylene sulfide. In an embodiment, the polyphenylene sulfide is linear and partially crystalline.

In an embodiment, the base has a first portion and a second portion opposite the first portion, the neck extending from the first portion of the base, the second portion comprising the compressible surface. In an embodiment, the first and second portions have a same width. In an embodiment, the first and second portions of the base comprise polyarylene sulfide.

In an embodiment, the material dispensing system is a fixed-z pump system. In an embodiment, the material dispensing system is a floating-z pump system.

In an embodiment, the pump includes a cartridge; the outlet at a distal end of the cartridge, and wherein the cartridge further comprises a feed screw that delivers the material from the pump from the inlet to the outlet.

In an embodiment, the material dispensing system further comprises a retainer nut that holds the dispense tip in place against the outlet surface.

In accordance with another aspect, a method of forming a dispense tip that communicates with a material dispensing pump comprises forming an elongated neck; molding a material to form a base having an outermost compressible surface; and coupling the base to the neck, wherein the base comprises an outermost region that includes a compressible fluid-tight surface that compliantly conforms to an outlet surface of the pump when the dispense tip is mounted to the pump.

In an embodiment, the material comprises polyarylene sulfide. In an embodiment, the polyarylene sulfide is polyphenylene sulfide. In an embodiment, the polyphenylene sulfide is linear and partially crystalline.

In an embodiment, the material has a low viscosity, such that the material conforms to the shape of the mold.

In an embodiment, the neck is formed of molded materials. In an embodiment, the neck is formed of ceramics. In an embodiment, the neck is machined from stainless steel. In an embodiment, the base is coupled to the neck by bonding the base to the neck with a bonding material. In an embodiment, the bonding material includes a two-part epoxy. In an embodiment, the method further comprises forming an elongated hole in the neck that extends from an input end of the neck to an output end of the neck; and forming an inner taper between the input end of the neck and the output end of the neck that transitions the input end to the output end. In an embodiment, a portion of the elongated hole has an inner surface of a first inner diameter and the output end includes an outlet having an inner surface of a second inner diameter, the first inner diameter being greater than the second inner diameter.

In an embodiment, forming the base includes forming a funnel that delivers fluid to the neck, the funnel having a funnel inlet at an input end of the funnel and a funnel outlet at an output end of the funnel, wherein the neck communicates with the funnel outlet such that the dispense tip includes a single material path between the funnel outlet and an output end of the neck.

In accordance with another aspect, a dispense tip that communicates with a material dispensing pump comprises an elongated neck, a base, and a material path between an outermost region of the base and an outlet of the neck; the dispense tip formed according to the process of molding a material having low viscosity to form a base; and coupling the base to the neck, wherein the outermost region of the base includes a compressible fluid-tight surface that compliantly conforms to an outlet surface of the pump when the dispense tip is mounted to the pump.

In accordance with another aspect, a dispense tip is constructed and arranged to communicate with a material dispensing pump, and comprises an elongated neck comprising stainless steel; and a base having a first portion and a second portion opposite the first portion. The first portion comprises stainless steel, the second portion comprises a compressible fluid-tight interface that compliantly conforms to an outlet surface of the material dispensing pump when the dispense tip is mounted to the pump.

In an embodiment, the second portion of the base comprises polyarylene sulfide.

BRIEF DESCRIPTION OF THE DRAWINGS

The above and other aspects and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings:

FIG. 5A is perspective view of an embodiment of a dispense tip including multiple necks coupled to a single base in accordance with aspects of the present invention;

DETAILED DESCRIPTION OF EMBODIMENTS

Figure 1A:
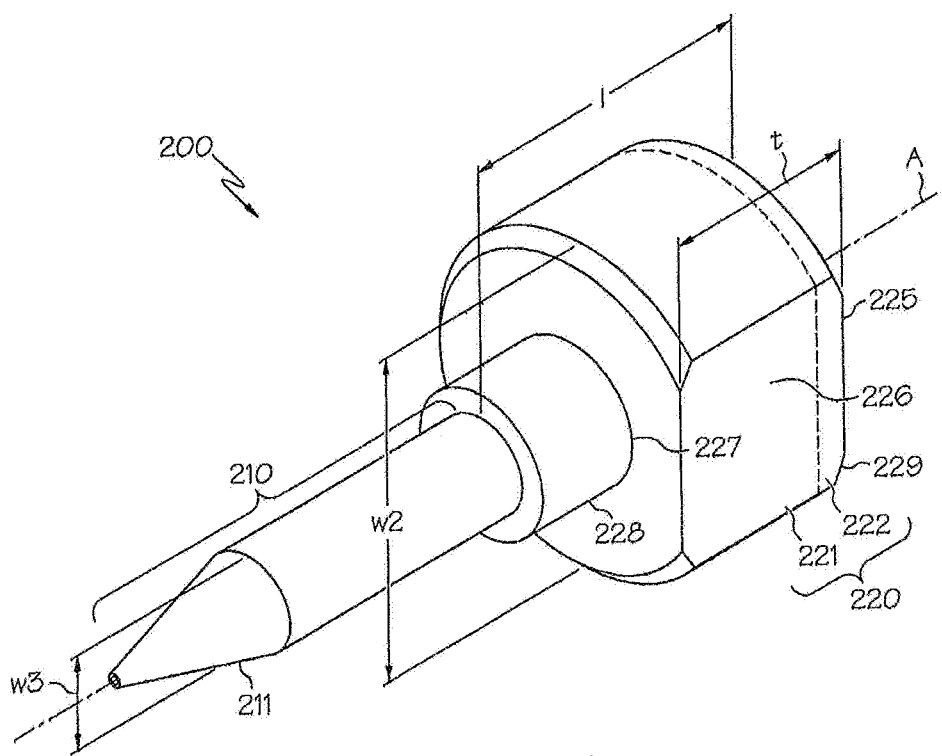
FIG. 1A is a perspective side view of an embodiment of a dispense tip in accordance with aspects of the present invention.

The accompanying drawings are described below, in which example embodiments in accordance with the present invention are shown. Specific structural and functional details disclosed herein are merely representative. This invention may be embodied in many alternate forms and should not be construed as limited to example embodiments set forth herein.

Accordingly, specific embodiments are shown by way of example in the drawings. It should be understood, however, that there is no intent to limit the invention to the particular forms disclosed, but on the contrary, the invention is to cover all modifications, equivalents, and alternatives falling within the spirit and scope of the claims.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on," "connected to" "abutting," "coupled to," or "extending from" another element, it can be directly on, connected to or coupled to the other element or intervening elements may be present. In contrast, when an element is referred to as being "directly on," "directly connected to," "directly abutting," or "directly coupled to" another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise.

In accordance with embodiments, dispense tips are provided that dispense precise amounts of material at precise positions on a substrate. In addition, the dispense tips prevent the material, which can include solids, liquids, and/or gases, from escaping or leaching from a material path in the dispense tip during a dispensing operation, or prevent the material from leaking from an interface formed between a surface of the dispense tip and a surface of a material dispensing pump against which the dispense tip abuts.

To achieve this, the dispense tips in accordance with embodiments comprise a compliant, deformable base that includes an interfacing surface at an outermost surface of the base that compliantly conforms to the surface of the material dispensing pump, and provides a fluid-tight interface between the dispense tip and the material dispensing pump. The term "fluid-tight interface" as used herein is also intended to refer to an airtight interface. Accordingly, the dispense tips prevent leaching of solvents through a surface thereof, and also prevent leaking of material to be dispensed from the fluid-tight interface.

In accordance with other embodiments, the dispense tips can comprise molded dispense tips, for example, formed by injection molding. In particular, a material is heated to a molding temperature, and injected into a mold. The material used to form the molded dispense tip is preferably a high-flow material, and has low viscosity properties. In certain embodiments, the dispense tips formed according to the molding process have favorable hardness properties, permitting the dispense tips to replace conventional steel dispense tips, which provides significant cost advantages over steel tips. In other embodiments, the surface of a molded dispense tip is compliantly compressible when coupled to a material dispensing pump, which prevents leaking from occurring at an interface between the dispense tip and the material dispensing pump. In other embodiments, the molded dispense tip includes chemical resistance properties, which, inter alia, permits the dispense tip to be resistant to the leaching of solvents. In addition, the dispense tips formed by molding are precision molded, i.e., molded to close tolerances, but do not require machining, and therefore, there is no risk of burrs or particles resulting from machining, which can become trapped in the material path of the dispense tip.

Figure 1B:
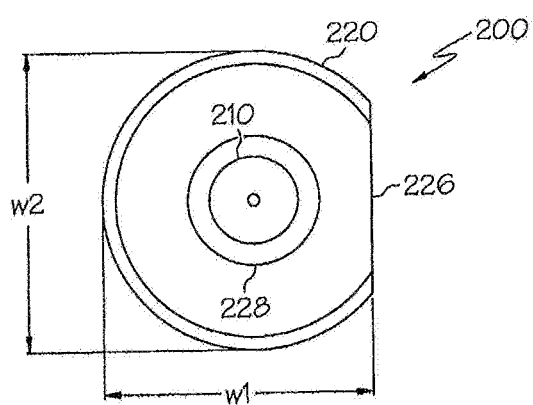
FIG. 1B is a front view of the dispense tip of FIG. 1A.

FIG. 1A is a perspective side view of an embodiment of a dispense tip 200 in accordance with aspects of the present invention. FIG. 1B is a front view of the dispense tip 200 of FIG. 1A.

As shown in FIGS. 1A and 1B, the dispense tip 200 comprises a neck 210 and a base 220 (also referred to herein as a body). In an embodiment, the neck 210 is formed separately from the base 220, and later joined to the base 220, in which case the base 220 and neck 210 can be coupled together via press-fitting, bonding, or welding, or other applicable techniques. In an embodiment, the neck 210 can be coupled to the base 220 by a bonding material. In an embodiment, the bonding material is a two-part epoxy, or other suitable adhesive known to those of ordinary skill in the art. In other embodiments, the dispense tip 200 is a unitary dispense tip, wherein the neck 210 and the base 220 are formed from a single stock of material that is molded or machined.

In an embodiment, the neck 210 can comprise materials such as stainless steel, ceramics, composites such as plastics, glass, composites of these materials, or other materials known to those of ordinary skill in the art as being suitable to form a neck that can dispense materials, which dispensed materials can include solids, liquids, gases, or a combination thereof.

The neck 210 can be formed by molding, in particular, micromolding, or formed by die casting or machining. The term "micromolding" is a term of art that is known to those of ordinary skill in the art, and, as used herein, can mean molding small, intricate precision plastic elements or structures for a variety of applications spanning numerous industries. In an embodiment, the neck 210 is formed by machining a stock such as stainless-steel stock or polymer stock, for example, plastic. In another embodiment, the neck 210 is formed by molded materials such as ceramics or polymers such as plastics. In embodiments, the neck 210 is formed according to approaches similar to those used to form necks of dispense tips disclosed in U.S. Pat. Nos. 6,547,167, 6,981,664, 6,957,783, and U.S. patent application Ser. No. 12/034,313, filed Feb. 20, 2008, entitled "Material Dispense Tips and Methods for Manufacturing the Same," the contents of each of which is incorporated herein by reference in its entirety.

In an embodiment, the neck 210 comprises an outlet bevel 211 about an opening at an output end of the neck, to reduce the amount of surface tension, or "land," at the opening, for example, as described in U.S. Pat. Nos. 6,547,167, 6,981,664, 6,957,783, and U.S. patent application Ser. No. 12/034,313, filed Feb. 20, 2008, entitled "Material Dispense Tips and Methods for Manufacturing the Same," the contents of each of which is incorporated by reference herein in its entirety.

Figure 2:
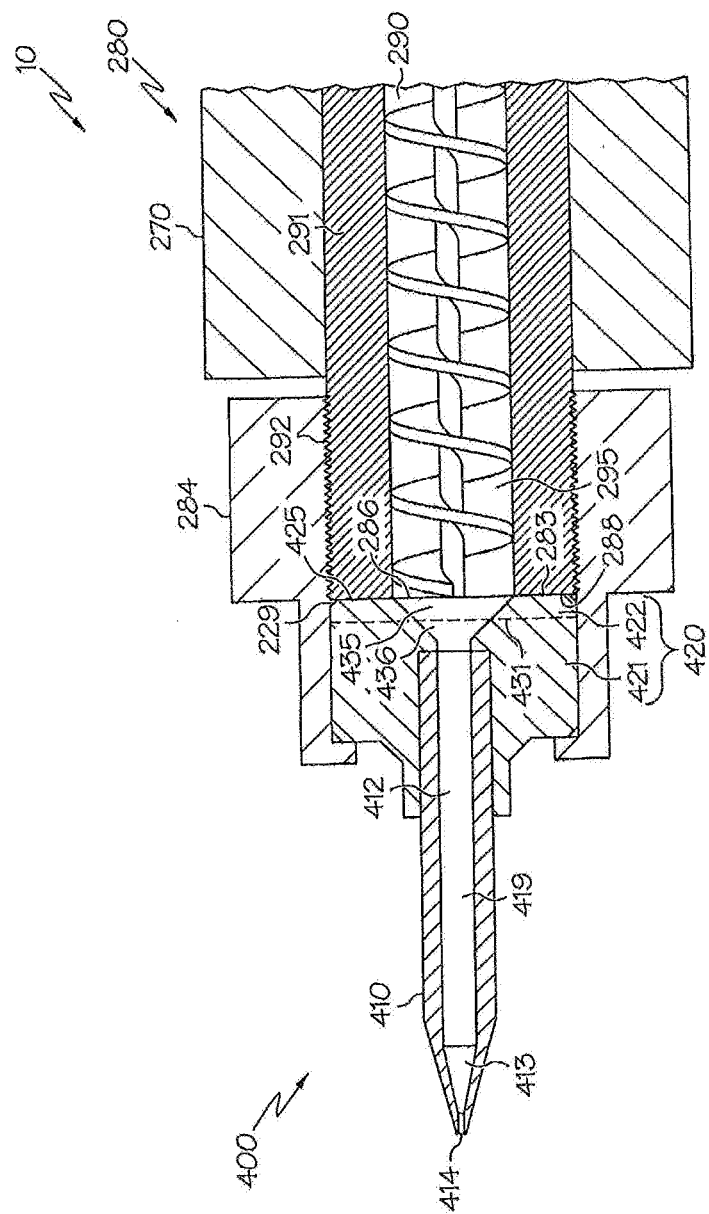
FIG. 2 is a cutaway side view of an embodiment of a material dispensing system comprising a dispense tip coupled to a material dispensing pump in accordance with aspects of the present invention.

In an embodiment, the base 220, for example, at least a second portion 222 of the base 220, comprises a material that is compliant or deformable relative to a surface hardness of a material dispensing pump to which the base 220 is coupled. As a result of the compliant base, when the dispense tip 200 is coupled to an outlet region of the material dispensing pump, for example, as illustrated in FIG. 2, or to a conventional dispensing pump, a fluid-tight interface is formed between the base 220 and the material dispensing pump when the dispense tip 200 is mounted to the dispensing pump. In an embodiment, the entire base 220, at least including a first portion or main body portion 221 and the second outermost portion 222, comprises the compliant material. In another embodiment, at least the second portion 222 of the base 220 comprises the compliant material, such that the second portion 222 of the base 220 is more deformable or compliant relative to a surface hardness of a material dispensing pump than the first portion 221 of the base 220. In another embodiment, the first portion 221, the second portion 222, and a third neck-retaining portion 228 all comprise the compliant material.

As shown in FIGS. 1A and 1B, in an embodiment, the base 220 is a molded base 220 comprising a polymer material having a low viscosity, wherein cavities or voids that may otherwise be formed in the mold during formation of the molded base 220 are filled during the molding process. Therefore, the base 220 includes hardness properties similar to those of conventional machined bases, but is also resistant to solvents, and also includes a compliantly conforming fluid-tight interface 288, as shown in FIG. 2. Other preferred properties of a molded-type base include a viscosity low enough for the composition to readily conform to the shape of the mold, high-temperature resistance (e.g., up to about 240° C.), chemical and oxidation resistance, sufficient hardness and rigidity, low creep, and low permeability after molding.

In an embodiment, the base 220 includes a first portion 221 and a second portion 222 extending from a first side surface of the first portion 221. In an embodiment, the first and second portions 221, 222 extend along the thickness (t) of the base 220 and have a same outer width, for example, a same outer width (w1), and/or a same outer width (w2). In another embodiment, the first portion 221 and the second portion 222 have different outer dimensions, such as different outer widths.

In an embodiment, the base 220 includes a third portion 228 that extends from a second side surface 227 of the first portion 221, wherein the first portion 221 is positioned between the second portion 222 and the third portion 228. In another embodiment, the third portion 228 extends from a surface of the second portion 222. In an embodiment, the first and second portions 221, 222 have greater widths than the width of the third portion 228. The third portion 228 can provide added rigidity to the dispense tip 200 by extending from the first portion 221 and receiving the neck 210.

Further, the third portion 228 can provide an improved geometry of the dispense tip 200 with regard to the relationship between the diameter or width of the neck 210 and the length of the base 220. Specifically, the addition of the third portion 228 of the base 220 increases the overall length of the base 220 from base length (t), also referred to as base thickness, to base length (1). Accordingly, the ratio of base length (1) to neck width (w3) is increased as compared to the ratio of base length (t) to neck width (w3).

This increased ratio is beneficial in embodiments where the base 220 is formed separately from the neck 210, and the neck 210 is coupled to the base 220 by inserting the neck 210 into a hole (not shown) in the base 220. In these embodiments, the base 220 extends along a longitudinal axis A, and when the neck 210 is inserted into the base 220, the neck 210 likewise extends along the longitudinal axis A. It is preferable that there is no angular deviation between the neck 210 and the longitudinal axis A. To achieve this, the hole extends through the third portion 228, as well as the first and second portions 221 and 222 of the base 220, and the neck 210 is inserted into the hole at the third portion 228 of the base 220 and extends through the third portion 228 into at least a portion of the second portion 228 of the neck 210. Accordingly, the increased length (1) of the base 220 relative to the neck width (w3) can minimize or prevent any angular deviation between the neck 210 and the axis A.

The neck 210 can extend from the second side 227 of the base 220, or alternatively, when the base 220 comprises a third portion 228, the neck 210 can extend from the third portion 228 of the neck. In embodiments where the neck 210 is formed separately from the base 220, the neck 210 can be inserted into the third portion 228 of the neck 210. In other embodiments, the neck 210 and the base 220 including the third portion 228 are molded from a common material.

In an embodiment, at least the second portion 222, and optionally the first portion 221 of the base 220 comprises a compliant material, such as a molded polyarylene sulfide. In other embodiments, the first portion 221, second portion 222, and third portion 228 comprise a compliant material, such as a molded polyarylene sulfide. In other embodiment, the base 220 and the neck 210 comprises a compliant material, such as a molded polyarylene sulfide. In an embodiment, the molded polyarylene sulfide is a linear, partially crystalline polyphenylene sulfide, for example, available FORTRON™ 6165A6 PPS, or various forms of FORTRON™ 6165A6 PPS, such as FORTRON™ 6165A6NAT, a color designation of the material. In an embodiment, at least the second portion 222, and optionally at least the first portion 221, third portion 228, and neck 210 comprise linear polymers.

The abovementioned molded polyarylene sulfide structure can also include glass fibers and one or more minerals (e.g., chalk, calcium carbonate, wollastonite, silicon dioxide, talc, mica, montmorillonite, and/or phyllosilicates) at a combined weight percent, e.g., 65%. The polyarylene sulfide includes repeating units aryl groups bonded by sulfur (thioether) linkages. The repeating unit of polyphenylene sulfide ($C_6H_4S$) can be expressed as follows:

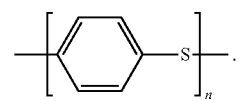

Approximate mechanical properties of FORTRON™ 6165A6 polyphenylene sulfide are as follows:

| | |
|---|---|
| Tensile Strength: | 130 MPa |
| Strain at Break: | 1.2% |
| Tensile Modulus: | 19,000 MPa |
| Flexural Strength: | 210 MPa |
| Flexural Modulus: | 18,800 MPa |
| Compressive Strength: | 230 MPa |
| Compressive Modulus: | 18,500 MPa |
| Impact Strength (Charpy): | 20 kJ/m$^2$ |
| Notched Impact Strength (Charpy): | 7 kJ/m$^2$ |
| Notched Impact Strength (Izod): | 6 kJ/m$^2$ |
| Ball Indentation Hardness (30 sec.): | 428 N/mm$^2$ |
| Rockwell Hardness (scale M) | 100 |

Other suitable compositions may possess similar approximate mechanical properties in combination with a substantial impermeability to solvents from the pumped composition.

In an embodiment, the second portion 222 has the same cross-sectional dimensions, such as width or diameter, cross-sectional surface area, etc., as the first portion 221 along its thickness relative to the longitudinal axis A, i.e., from an outermost surface 225 (also referred to as a rear face) at a first side of the base 220 to a second side 227 of the base 220. Although the cross-sectional dimensions can be referred to herein as including "diameters," such cross-sections are not necessarily a perfect circle; thus, the term "diameter" can include other, non-circular, cross-sectional shapes, for example, the cross-sectional shape of the base 220 shown in FIG. 1B, in which case, the term "diameter" can also refer to "widths" of those cross-sectional shapes. In another embodiment, the second portion 222 can have different dimensions than the first portion 221. For example, the second portion 222 can have a larger diameter than the first portion 221, or the second portion 222 can have a different shape than the first portion 221.

In an embodiment, the base 220 is substantially cylindrical. In other embodiments, as shown in FIGS. 1A and 1B, a portion of the base 220 has a flat surface 226, also referred to as an alignment surface or locator, that extends along a plane that is parallel to the axis A. The flat surface 226 permits the base 220 to be coupled to a material dispensing pump comprising a locator or tab that protrudes from the pump, for example, see tab 387 shown in FIG. 3A, which permits the dispense tip 200 to be properly aligned with the material dispensing pump 280. In an embodiment, the base 220 includes a chamfer 229, preferably about an edge of the second portion 222, for proper seating of the base 220 against a material dispensing pump, for example, as shown in FIG. 2.

In an embodiment, the dispense tip 200 is compatible with a fixed-z dispensing pump system. In an embodiment, the dispense tip 200 is compatible with a floating-z (also referred to as compliant-z) dispensing pump system. In a fixed-z dispensing pump system, the longitudinal positions of the dispense tip and pump are fixed relative to each other. In a floating-z dispensing pump system, the longitudinal positions of the dispense tip and pump can translate in a longitudinal direction relative to each other.

In an embodiment, the dispense tip 200 is operable in a dispensing pump and gantry system configured to dispense fluid material in the form of a dot. In another embodiment, the dispense tip 200 can dispense fluid material in the form of a line. In another embodiment, the dispense tip 200 can dispense fluid material in the form of an "X" or a star-shaped pattern by an outlet similar to outlets described with regard to U.S. Pat. No. 6,957,783, incorporated by referenced above. In other embodiments, the dispense tip 200 can dispense fluid material in the form of other dispensing patterns known to those of ordinary skill in the art.

FIG. 2 is a cutaway side view of an embodiment of a material dispensing system 10 comprising a dispense tip 400 coupled to a material dispensing pump 280 in accordance with aspects of the present invention. In an embodiment, the dispensing pump 280 comprises a detachable pump cartridge 270. The cartridge 270 includes a feed screw or auger screw 290 positioned in a feed screw cavity 291. The feed screw 290 delivers material to an outlet region 295 of the feed screw 290.

In an embodiment, an outermost surface or rear face 425 of a second portion 422 of the base 420 can be compressed against, and can be made to compliantly conform to, an outlet surface 283 of the outlet region 295 to form a fluid-tight interface 288 between the base 420 and the pump cartridge 270. In one embodiment, the interface 288 is a "surface-mount" interface, wherein the pump 280 and dispense tip 400 each has an interfacing surface, wherein the interfacing surfaces are made to come in contact with each other and retained against each other under pressure or force, for example, by a nut, clamp, or other retaining device that holds the dispense tip 400 in place against the outlet surface 283. In another embodiment, the interface is a "threaded" interface, for example, a Luer™ or other threaded interface, wherein the dispense tip 400 is attached to or removed from the pump by turning the dispense tip 400 in a clockwise or counterclockwise direction about the axis A.

In an embodiment, as shown in FIG. 2, the material dispensing pump 280 has a dispense tip interface, referred to for purposes of the present disclosure as a "surface-mount" interface, described above, wherein the pump 280 has the abovementioned outlet surface 283 against which the dispense tip 400 abuts, and a retainer nut 284 holds the dispense tip 400 in place against the outlet surface 283, and applies a force against the base 420 that is sufficient to compress the base 420 against the outlet surface 283 such that at least the second portion 422 of the base 420 is deformable relative to the outlet surface 283 to form a fluid-tight seal or interface 288 between the base 420 and the outlet surface 283. In an embodiment, the rotational torque of nut 284 on threads 292 of the pump outlet translates to a force, which deforms the base 220 to form the interface 288. In an embodiment, the retainer nut 284 is used when the base 420 is a non-threaded base. In other embodiments, a retaining nut is not required to hold the dispense tip 400 in place against the outlet surface 283. Rather, the outlet region 295 of the dispensing pump 280 includes a threaded interface, wherein the base 420 can be attached to or removed from the threaded interface of the base 420 by turning the base in a clockwise or counterclockwise direction about the axis A. In other embodiments, the dispense tip 400 can interface with other dispensing pumps, for example, pumps having a Luer™-compliant interface, wherein the pump body has a female Luer™ fitting at its outlet, which interfaces with a corresponding male Luer™ fitting at the inlet of the dispense tip.

In an embodiment, the neck 410 comprises an elongated hole 419 that extends from an input end 412 of the neck 410 to an output end 414 of the neck 410. The neck 410 includes an inner taper 413 between the input end 412 of the neck 410 and the output end 414 of the neck 410 that transitions the input end 412 to the output end 414. A portion of the elongated hole 419 has an inner surface of a first inner diameter and the output end 414 includes an outlet having an inner surface of a second inner diameter that is less than the first inner diameter. In the embodiment shown in FIG. 2, the inner taper 413 is proximal to the output end region 414 of the neck. In other embodiments, the inner taper 413 can extend from an interface region proximal to the input end 412 of the neck 410 to the output end 414 of the neck 410.

In an embodiment, the elongated hole 419 has a first inner diameter that is substantially constant along the length of the hole 419. In another embodiment, the neck hole 419 comprises a taper or draft from the input end 412 of the neck hole 419 to an outlet hole at the outlet end 414, such that a diameter at an input end 412 of the neck hole 419 is greater than a diameter at an output end 414 of the outlet hole. In another embodiment, the neck hole 419 comprises a taper or draft from the input end 412 of the neck hole 419 to the inner taper 413, such that a diameter at the input end 412 of the neck hole 419 is greater than a diameter at the opposite side of the neck hole 419 near the inner taper 413.

The base 420 includes a funnel 431 that delivers fluid to the neck 410. The funnel 431 includes a funnel inlet 435 at an input end of the funnel 431 and a funnel outlet 436 at an output end of the funnel 431 that is proximal to the input end region 412 of the neck 410. The neck 410 extends from the base 420 and communicates with the funnel outlet 436 such that the dispense tip 400 includes a single material path between the funnel outlet 436 and the output end 414 of the outlet hole. In an embodiment, the funnel inlet 435 at the input end of the funnel 431 is aligned with, and has the same or similar dimensions such as width, diameter, circumference, cross sectional surface area, etc., as an outlet hole 286 in the outlet region 295 of the material dispensing pump 280.

In an embodiment, the funnel 431 is formed in the first and second portions 421, 422 of the base 420. In an embodiment, the funnel 431 is formed in the first portion 421 of the base 420. This embodiment applies particularly to configurations where the second portion 422 of the base has different cross-sectional dimensions than the first portion 421 of the base, for example, when the second portion 422 is ring-shaped, doughnut-shaped, and the like, and has a smaller diameter than the first portion 421. Here, the second portion 422 has a hole that abuts the funnel inlet, such that an uninterrupted fluid path is provided from one end of the base 420 to the other end of the base 420.

In an embodiment, the funnel 431 in the base 420 has a funnel angle, for example, on the order of 45 degrees relative to the longitudinal axis of the neck hole 419. Other funnel angles are equally applicable to embodiments of the present invention, depending on the application.

In an embodiment, the outlet region 295 has the same cross-sectional dimensions as those dimensions of the second portion 422 of the base 420 of the dispense tip 400, for example, a same cross-sectional width or thickness.

Figure 3A:
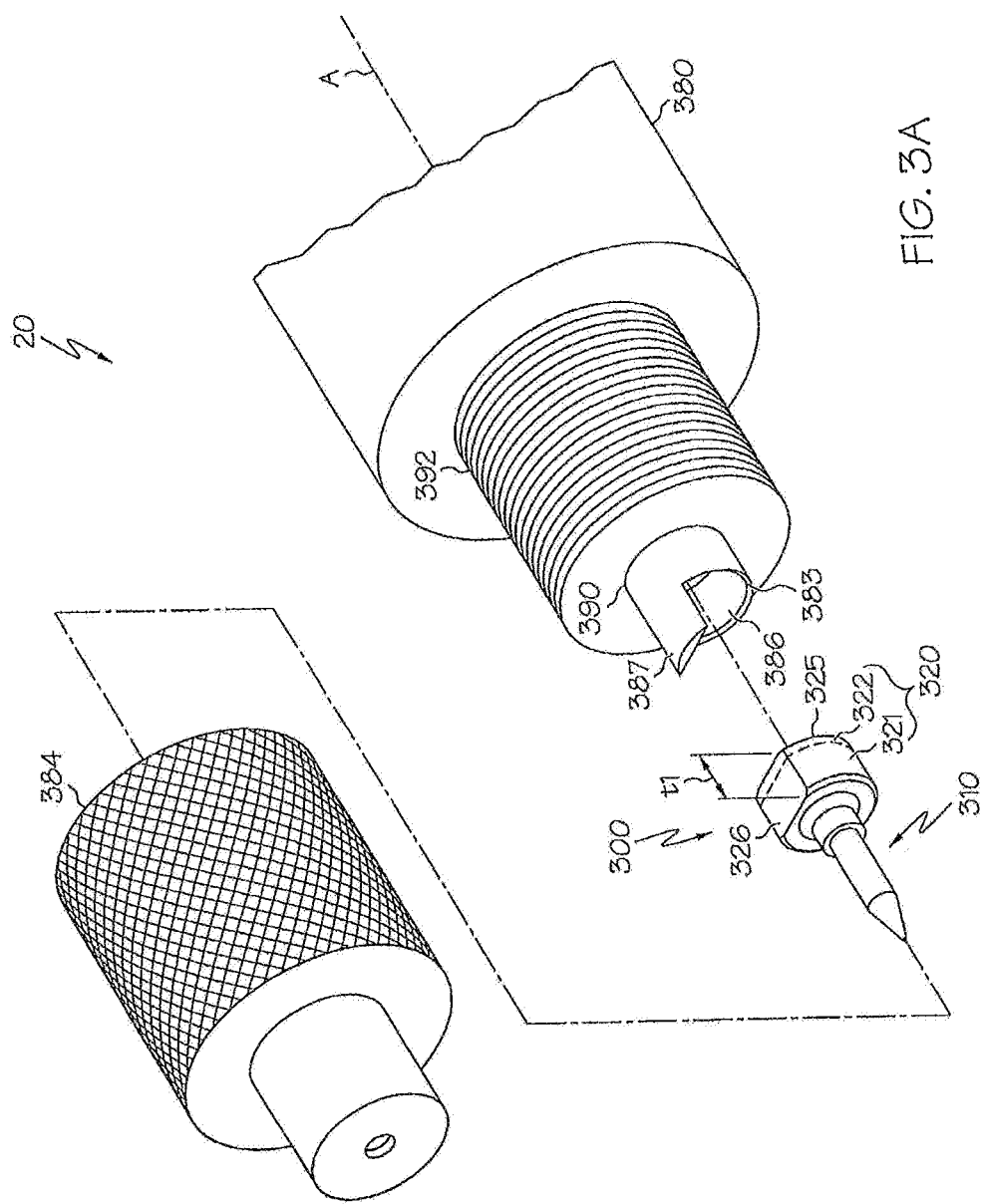
FIG. 3A is an exploded perspective view of an embodiment of a material dispensing system comprising a dispense tip and a material dispensing pump, in accordance with aspects of the present invention.
Figure 3B:
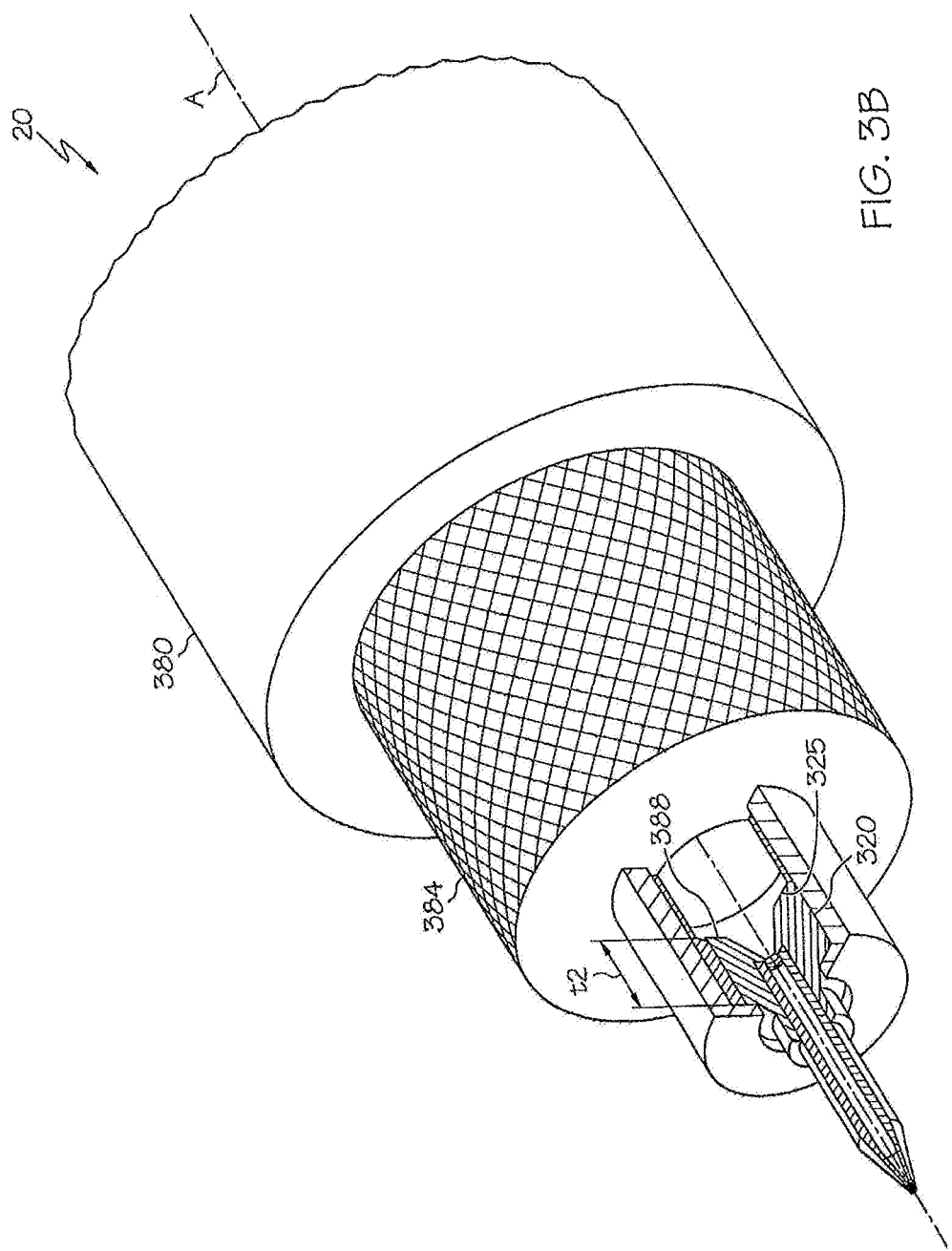
FIG. 3B is a cutaway, assembled perspective view of the material dispensing system of FIG. 3A, in accordance with aspects of the present invention.
Figures 3C, 3D:
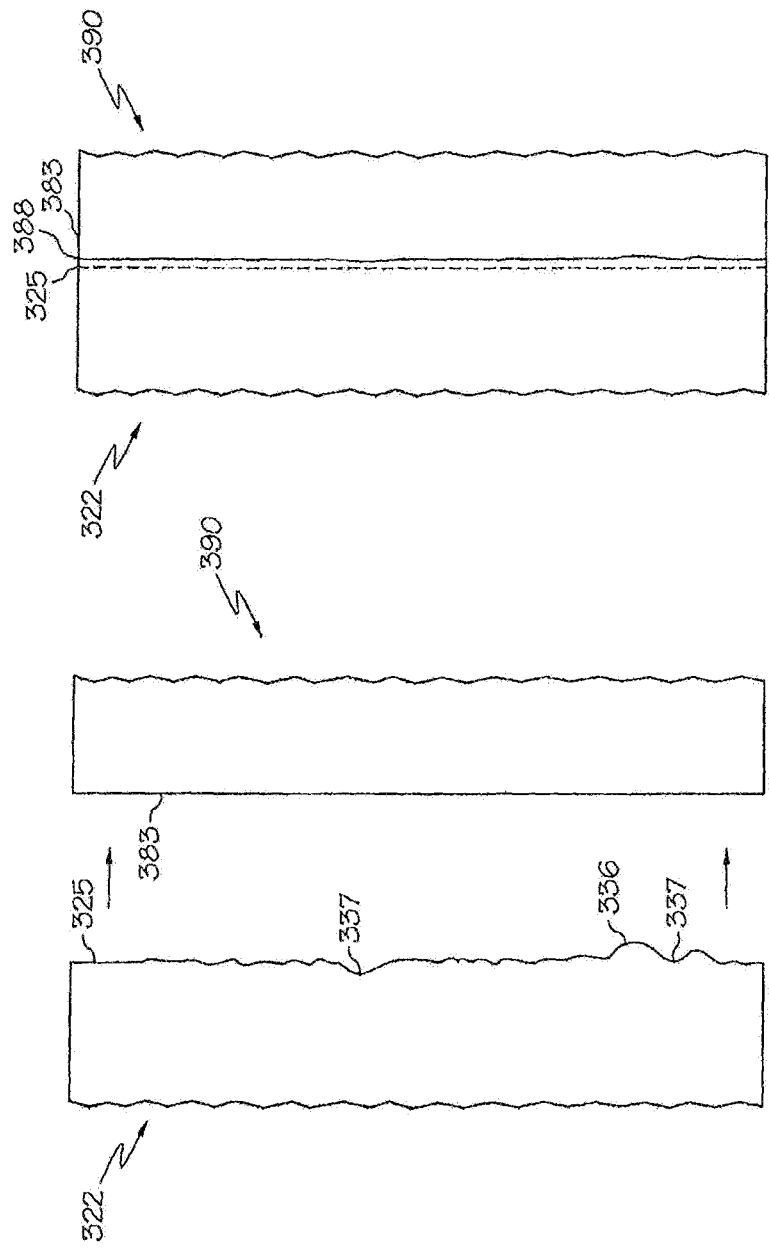
FIG. 3C is a close-up illustrative side view of an embodiment where interfacing surfaces of the dispense tip and the material dispensing pump of FIG. 3A in a position where they are separated from each other.
FIG. 3D is a close-up illustrative side view of an embodiment of an interface between the dispense tip and the material dispensing pump of FIG. 3B in a position where they are coupled together.

FIG. 3A is a perspective view of an embodiment of a material dispensing system 20 comprising a dispense tip 300 and a material dispensing pump 380, wherein the dispense tip 300 is separated from the material dispensing pump 380, in accordance with aspects of the present invention. FIG. 3B is a perspective view of the material dispensing system 20 of FIG. 3A, wherein the dispense tip 300 is coupled to the material dispensing pump 380, in accordance with aspects of the present invention. FIG. 3C is a close-up illustrative side view of an embodiment where interfacing surfaces 325, 383 of the dispense tip 300 and the material dispensing pump 380 of FIG. 3A, respectively, are in a position where they are separated from each other. FIG. 3D is a close-up illustrative side view of an embodiment of an interface 388 between the dispense tip 300 and the material dispensing pump 380 of FIG. 3B in a position where they are coupled together.

In the embodiments illustrated and described with regard to FIGS. 3A-3D, the dispense tip 300 includes a molded base 320 having a second portion 322 comprising a compliant material similar to that used to form the base 220 described with regard to FIGS. 1A, 1B, and 2, for example, a molded polyarylene sulfide such as molded polyphenylene sulfide.

In FIG. 3A, the dispense tip 300 is separated from the pump 380, wherein the molded base 320 of the dispense tip 300 has similar dimensions, such as base thickness (t1), first width, and second width as those of the base 220 shown in FIGS. 1A and 1B, or FIG. 2. In an embodiment, when the base 320 is attached to the material dispensing pump 380, the thickness of the base 320 can be reduced in thickness from its first thickness (t1) to a second smaller thickness, for example, thickness (t2), and/or the cross-sectional dimensions, such as a width of the base 320 perpendicular to its thickness, can be increased to a greater width. In an embodiment, the deformation of the base 320, i.e., the reduction in thickness of the base 320, and/or increase in width or other dimensions of the base 320, can occur due to a force that is applied to the base 320 as a result of a retainer nut 384 in a direction of the axis A along which the dispense tip 300 and the pump 380 are positioned. In an embodiment, the base 320 retains its deformed shape even after a subsequent separation from the pump 380, referred to as "permanent deformation" or "plastic deformation." In another embodiment, the deformation of the base 320 undergoes a temporary shape change when the force is applied that is self-reversing after the force is removed, and after the base 320 is subsequently separated from the pump 380, referred to as "elastic deformation." In an embodiment, little or no deformation is made to the base 320 when the base 320 is attached to the pump 380 to form the fluid-tight interface 388. Specifically, a fluid-tight interface 388 is formed between an outermost surface 325 of the base 320 of the dispense tip 300 and the outlet surface 383 of the outlet region 390 of the pump 380 with little or no change in change in thickness, width, length, surface area, or other dimensions.

As described above, a force can be applied to the dispense tip 300 by attaching a retainer nut 384 to the pump 380. Here, the dispense tip 300 is positioned between the retainer nut 384 and the pump 380 such that a fluid-tight interface 388 is formed between an outermost surface 325 of the base 320 of the dispense tip 300 and an outlet surface 383 of an outlet region 390 of the pump 380. In an embodiment, the pump 380 has a surface-mount interface, wherein the nut 384 includes threads that interface with the threads 392 on the pump 380. Here, torque is created when the nut 384 is tightened, which in turn results in a force being applied to the base 320, and the abovementioned deformation to occur. In an embodiment, the dispense tip 300 is attached to the pump 380 by threading the base 320 to the pump 380, for example, in a Luer™ configuration, or by other approaches known to those of ordinary skill in the art such that a fluid-tight interface 388 is formed between the base 320 of the dispense tip 300 and the surface 383 of the outlet region 390 of the pump 380.

In an embodiment, the base 320 comprises a flat surface 326 that is aligned with a locator or tab 387 that protrudes from the outlet region 390 cartridge 370 in a direction along the axis A. In this manner, as shown in FIG. 3A, a hole 386 in the outlet region 390 of the dispensing pump 380 is aligned with a hole (not shown) in the dispense tip 300, for example, a funnel inlet similar to that shown in FIG. 2, such that a single uninterrupted material path is formed between the outlet region 390 and an outlet 340 at the end of the dispense tip 300.

As shown in FIGS. 3A-3D, an outermost surface 325 of the second portion 322 of the base 320 can be compressed against, and tightly abut, an outlet surface of a dispensing pump 380 to form a fluid-tight seal or interface 388 between the base 320 and the outlet surface 383 of the pump 380. Thus, in the event that either the outlet surface 383 or the base surface 325 has any imperfections such as cracks, crevices, and the like, for example, illustrated in FIG. 3C, the second portion 322 of the base 320 can compliantly conform to the outlet surface 383 to reduce or eliminate leaking of dispensing material from the interface region 388 between the base 320 and the pump 380, or leaching of solvents from the material during a dispensing operation that would otherwise occur, for example, illustrated in FIG. 3D. This can include materials and/or solvents that comprise solids, liquids, and/or gases, or other commonly dispensed materials and can include solder paste, conductive epoxy, surface mount epoxy, solder mask, epoxies, such as two-part epoxy, underfillers, oils, flux, silicone, gasket materials, glues, resins, pastes, medical reagents, certain materials, and the like, or other materials known to those of ordinary skill in the art.

The molded base 320 preferably has a substantially flat outermost surface 325. However, even if imperfections are present on the outermost surface 325 of the molded base 320, such as protrusion 336 or voids 337 shown in FIG. 3C, the fluid-tight interface 388 eliminates or reduces any leaking that may otherwise occur due to the presence of the protrusion 336 and/or voids 337, in particular, when the protrusion 336 extends from the surface less than 0.003 inches.

Figure 4A:
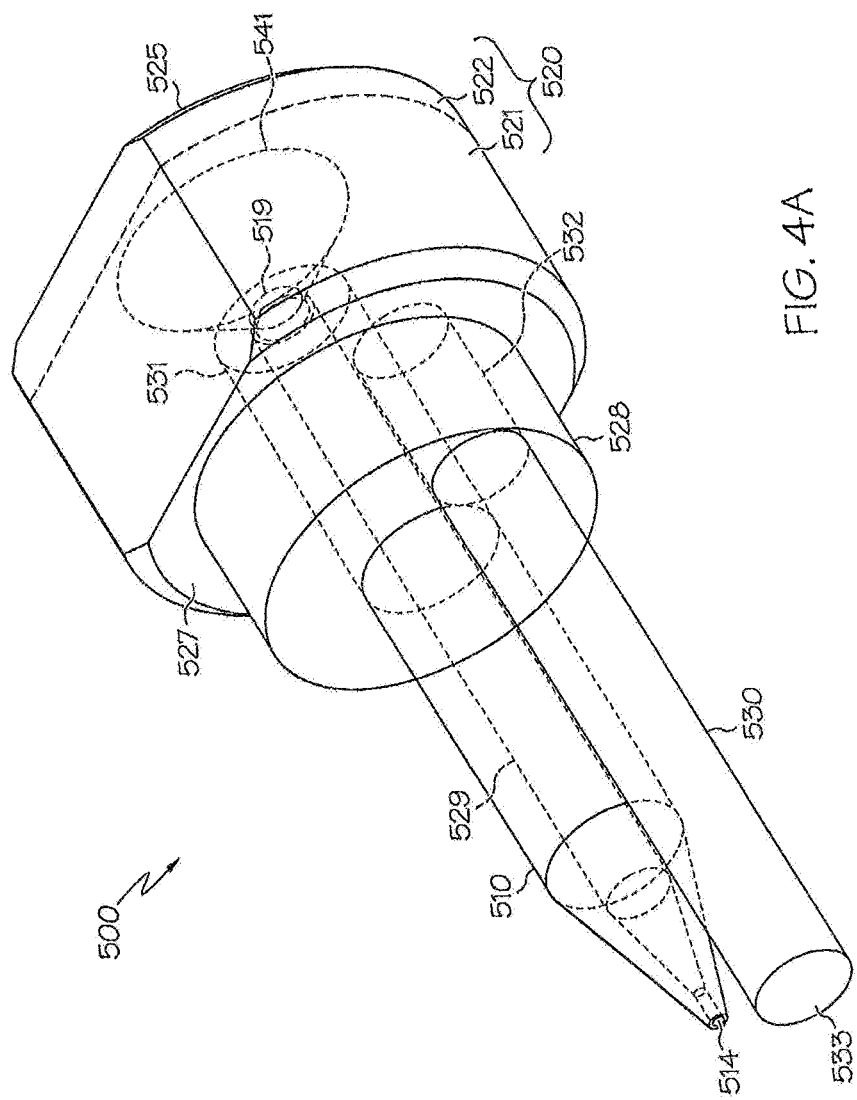
FIG. 4A is a perspective view of an embodiment of a dispense tip including an alignment foot, in accordance with aspects of the present invention.
Figure 4B:
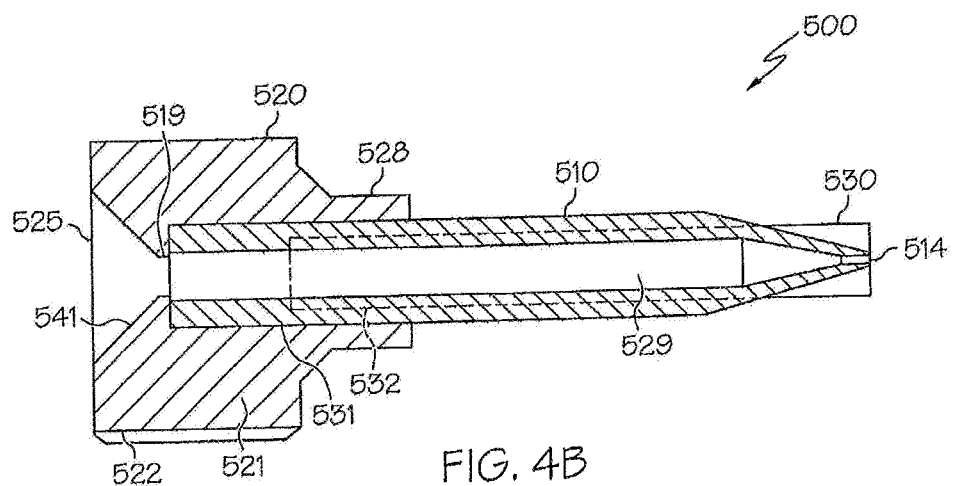
FIG. 4B is a cutaway side view of the dispense tip of FIG. 4A.
Figure 4C:
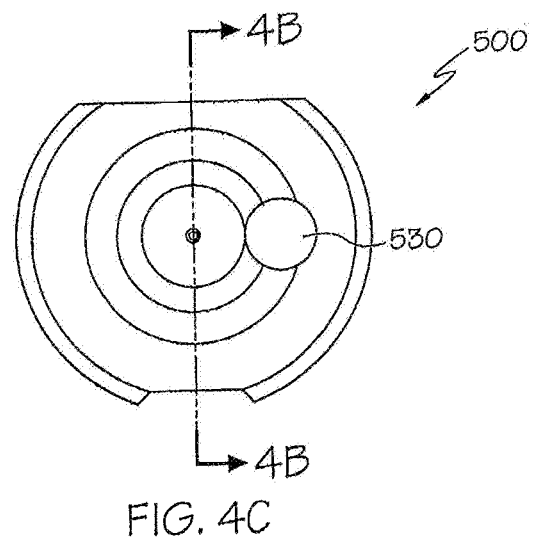
FIG. 4C is a front view of the dispense tip of FIG. 4A.

FIG. 4A is a perspective view of an embodiment of a dispense tip 500 including an alignment foot 530 in accordance with aspects of the present invention. FIG. 4B is a cutaway side view of the dispense tip 500 of FIG. 4A. FIG. 4C is a front view of the dispense tip 500 of FIG. 4A. In this manner, when the foot 530 comes in contact with the substrate, the tip opening 514 is a known vertical distance from the substrate during a dispensing operation.

The dispense tip 500 illustrated in FIGS. 4A-4C comprises a neck 510, a base 520, and a vertical alignment foot 530, also referred to as a vertical alignment foot. The foot 530 is adapted and configured for reliable and accurate vertical positioning of the tip opening 514 over a substrate during dispensing of material.

The foot 530 may be formed of a number of materials, including heat-treated steel, carbide, plastic, ceramic, investment casting, injection molded materials, stainless steel, titanium, gems such as ruby, sapphire, and the like, or other materials known to those of ordinary skill in the art as having hardness properties, and may be press-fit or bonded into the base 520. The foot 530 may be formed to include a radiused end 533, to allow for contact with the substrate without damaging the substrate, for example, when applying a line of material to the substrate.

In an embodiment, the base 520 comprises a first portion 521 and a second portion 522, which can be formed in a manner that is similar to the molded dispense tip bases described herein with regard to FIGS. 1A, 1B, 2, 3A, 3B, 3C, and 3D. In an embodiment, the elements of the base 520 comprise materials similar to those used to form the dispense tip bases described above with regard to FIGS. 1A, 1B, 2, and 3A-3D, for example, a molded polyarylene sulfide, such as molded polyphenylene sulfide.

In an embodiment, the base 520 comprises two holes: a first hole 531 into which the neck 510 is inserted, and a second hole 532 into which the alignment foot 530 is inserted. The neck 510 is positioned in the first hole 525 and joined to the base 520 by press-fitting, bonding, or welding, or other applicable techniques.

The neck 510 is inserted into the first hole 531 of the base 520 to interface with a third hole 519 in the base 520 that extends from a funnel 541 at an outermost surface 525 of the base 520 to the neck 510 such that an unobstructed material path is formed from the funnel 541 through the hole 519 in the base 520, through a hole 529 in the neck, to the tip opening 514 at an opposite end of the neck 510.

In an embodiment, the base 520 comprises a third portion 528 that extends from a surface 527 of the base 520 opposite the outermost surface 525 of the base 520, wherein the second hole 532 are each formed in the third portion 528 of the base 520, and wherein the first hole 531 is formed through the third portion of the base 528 to the first portion 521, or the second portion 522.

Figure 5B:
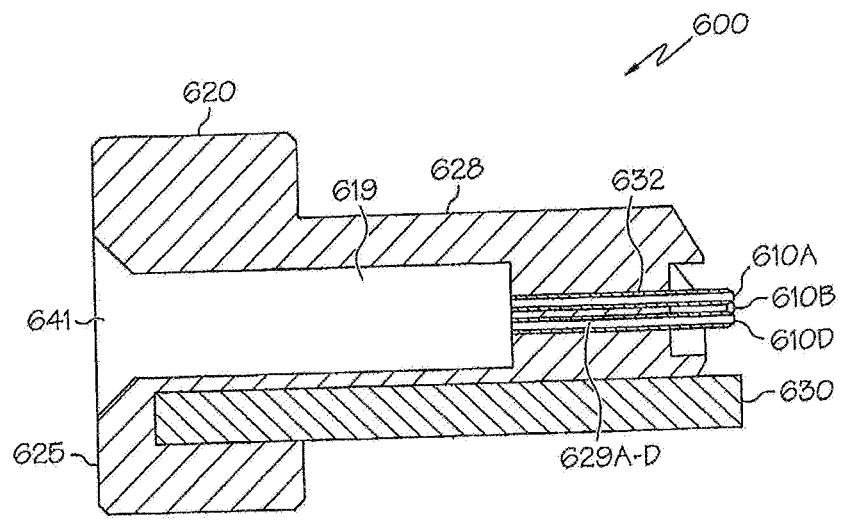
FIG. 5B is a cutaway side view of the dispense tip of FIG. 5A.
Figure 5C:
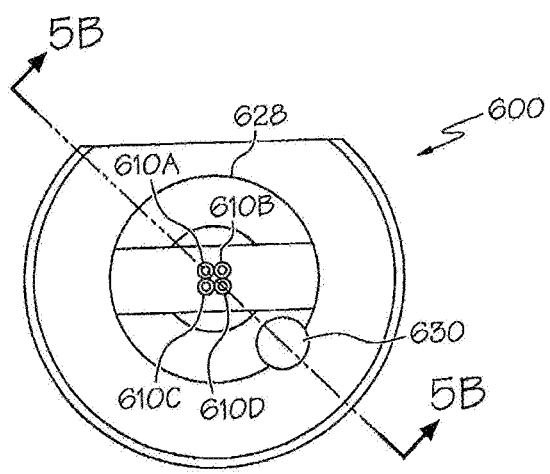
FIG. 5C is a front view of the dispense tip of FIG. 5A.

FIG. 5A is perspective view of an embodiment of a dispense tip 600 including multiple necks 610A-D coupled to a single base 620 in accordance with aspects of the present invention. FIG. 5B is a cutaway side view of the dispense tip 600 of FIG. 5A. FIG. 5C is a cutaway front view of the dispense tip 600 of FIG. 5A.

In the embodiment shown in FIGS. 5A-5C, a dispense tip 600 comprises four necks 610A-610D coupled to a base 620. However, alternative embodiments can include dispense tips having different numbers of necks, for example, two necks or six necks coupled to a same base.

In an embodiment, the base 620 comprises four holes or apertures 632 in a portion 628 of the base 620. Each of the holes 632 communicates with a larger hole 619 that extends through the base 620, which in turn communicates with a funnel 641 proximal to an outermost surface 625 at an end of the base 620 that interfaces with a dispensing pump. The first through fourth necks 610A-610D are joined to a base 620 by press-fitting, bonding, or welding, or other applicable techniques. Each neck 610A-610D includes a hole 629A-629D, respectively, having a single input end and a single output end. In this manner, a single material path is provided between the funnel 641 through the hole 619 and an elongated hole 629A-D to a corresponding outlet 614A-D at the output end of each neck 610A-D, respectively.

In an embodiment, the dispense tip 600 includes an alignment foot 630 that is parallel to the necks 610A-D to ensure rigidity and alignment of the dispense tip.

Figure 6A:
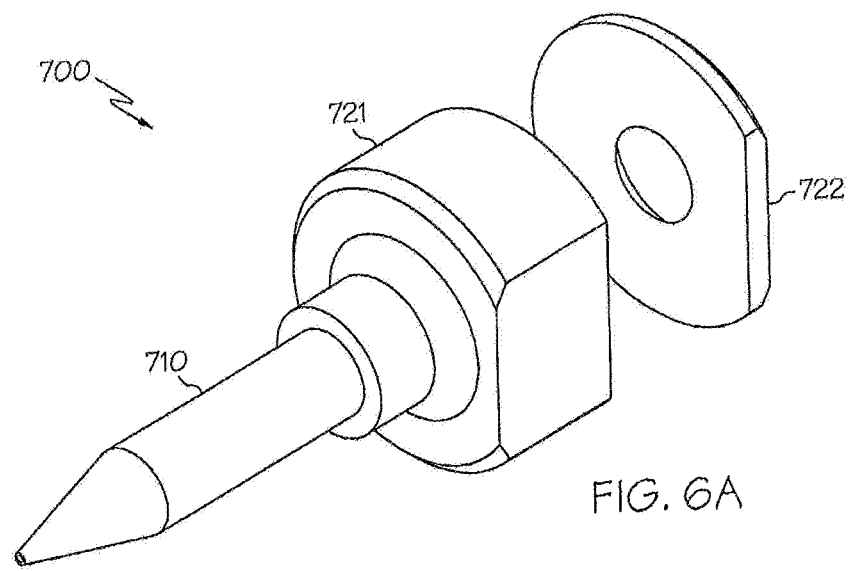
FIG. 6A is a perspective view of an embodiment of a dispense tip having a first portion of a base that is separate from a second portion of the base, in accordance with aspects of the present invention.
Figure 6B:
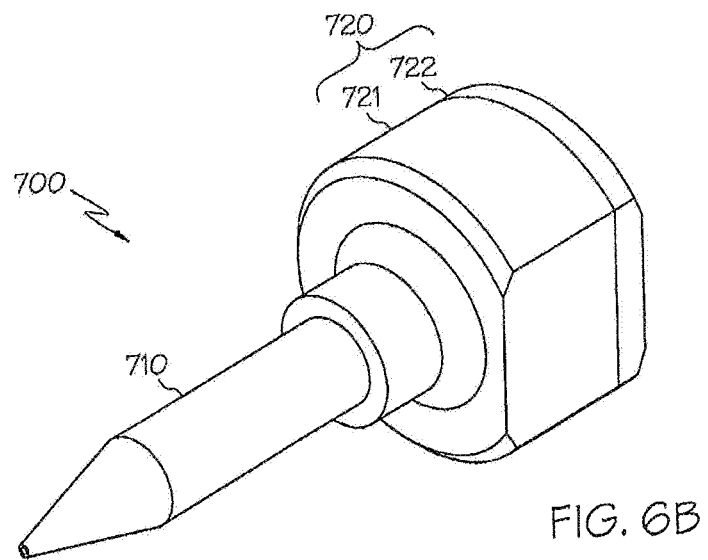
FIG. 6B is a perspective view of the dispense tip of FIG. 6A, wherein the first portion of the base is coupled to the second portion of the base, in accordance with aspects of the present invention.

FIG. 6A is a perspective side view of an embodiment of a dispense tip 700 having a first portion 721 of a base 720 that is separate from a second portion 722 of the base 720, in accordance with aspects of the present invention. FIG. 6B is a perspective side view of the dispense tip 700 of FIG. 6A, wherein the first portion 721 and second portion 722 of the base 700 are coupled together, in accordance with aspects of the present invention.

In one approach, the neck 710 and first portion 721 of the base 720 can be unitary and machined from a common stock, for example, stainless steel, or molded from a common material, for example, ceramics. In another approach, the neck 710 and first portion 721 of the base 720 can be formed by different methods, and of different materials, for example, plastics. In some embodiments, the dispense tip 700 including the neck 710 and first portion 721 of the base 720 can be formed in accordance with other approaches described herein.

In other embodiments, the dispense tip having the neck 710 and the first portion 721 of the base shown in FIG. 6A can be similar to those dispense tips described with regard to U.S. Pat. Nos. 6,547,167, 6,981,664, 6,957,783, and U.S.

patent application Ser. No. 12/034,313, filed Feb. 20, 2008, entitled "Material Dispense Tips and Methos for Manufacturing the Same," by Jeffrey P. Fugere, the contents of each of which are incorporated herein by reference in their entirety.

In an embodiment, the first portion 721 can have the same outer width, or can be of different dimensions, for example, different outer widths.

The second portion 722 of the base 720 comprises a material that is compliant relative to a surface hardness of a material dispensing pump to which the base 720 is coupled. The second portion 722 can comprise materials similar to those described above, for example, materials similar to or the same as those of base 220 of FIG. 1 described above, for example, molded polyarlyene sulfide. Accordingly, the second portion 722 can include properties, geometries, and features similar to those described above, and can comprise materials similar to or the same as those of base 220 of FIG. 1 described above.

The second portion 722 and first portion 721 can be coupled together by bonding or other applicable techniques. In an embodiment, the second portion 722 can be coupled to the first portion 721 by a bonding material, such as a suitable adhesive known to those of ordinary skill in the art.

As described above, embodiments of the present invention are directed to dispense tips that include a compliant molded base that provides a fluid-tight interface when abutting the surface of a material dispensing pump during a dispensing operation. In particular, portions of the compliant base fill the imperfections to form a fluid-tight interface between the base and the pump. Thus, regardless of viscosity or other characteristics of the material that is dispensed, the fluid-tight interface prevents the material, or elements of the material, such as solvents, from leaching that would otherwise occur due to imperfections in either the dispense tip or the pump surface.

While embodiments of the invention have been particularly shown and described above, it will be understood by those skilled in the art that various changes in form and detail may be made herein without departing from the spirit and scope of the invention as defined by the appended claims.

What is claimed is:

1. A method of forming a base of a material dispense tip, comprising:
   molding a polymer material to form a base including a proximal end having a low viscosity for coupling to an outlet surface of a material dispensing pump, including filling cavities or voids in the polymer material; and
   forming a funnel through the polymer material that delivers fluid from the material dispensing pump to a distal end of the molded polymer material, the funnel having a funnel inlet at an input end of the funnel and a funnel outlet at an output end of the funnel; and
   constructing and arranging the funnel outlet to align with and couple to an elongated neck such that the material dispense tip includes a single material path between the funnel outlet and an outlet at the distal end of the neck.

2. The method of claim 1, further comprising:
   coupling a neck to the distal end of the base, the neck having a hole from an input end region of the neck to an output end region of the neck, the single material path extending through from the outlet at the distal end of the neck to the hole of the neck.

3. The method of claim 2, further comprising:
   forming an inner taper in the neck that transitions the hole from a first inner diameter to a second inner diameter, wherein at least a portion of the inner taper is in the output end region of the neck.

4. The method of claim 2, wherein the base includes a portion extending from the distal end of the base to increase a ratio of base length to a width of the neck.

5. The method of claim 1, wherein the proximal end of the base includes a compressible fluid-tight surface that compliantly conforms to the outlet surface of the material dispensing pump when the dispense tip is mounted to the material dispensing pump.

6. The method of claim 1, wherein the polymer material is resistant to solvents and includes a compressible fluid-tight surface that compliantly conforms to an outlet surface of the material dispensing pump when the material dispense tip is mounted to the material dispensing pump.

7. The method of claim 1, wherein the proximal end of the base has a deformation property that is greater than the distal end of the base.

8. The method of claim 1, wherein the polymer material includes polyarylene sulfide.

9. The method of claim 1, wherein the dispense tip is constructed and arranged to communicate with a fixed-z material dispensing pump.

10. The method of claim 1, wherein the dispense tip is constructed and arranged to communicate with a floating-z material dispensing pump.

11. The method of claim 1, wherein the proximal end of the base is constructed and arranged as a surface mount interface.

12. The method of claim 1, wherein the base includes a threaded interface.

13. A method of forming a base of a material dispense tip, comprising:
   molding a polymer material to form a first portion of a base including a proximal end having a low viscosity for coupling to an outlet surface of a material dispensing pump, including filling cavities or voids in the polymer material; and
   forming a hole through the polymer material that delivers fluid from the material dispensing pump to the distal end of the molded polymer material, the hole having an inlet and an outlet;
   coupling the distal end of the molded polymer material to a second portion of the base, wherein the hole is aligned with a hole in the second portion of the base to form a single material path through the first and second portions of the base.

14. A material dispense tip formed according to a process comprising:
   molding a polymer material to form a base including a proximal end having a low viscosity for coupling to an outlet surface of a material dispensing pump, including filling cavities or voids in the polymer material; and
   forming a funnel through the polymer material that delivers fluid from the material dispensing pump to a distal end of the molded polymer material, the funnel having a funnel inlet at an input end of the funnel and a funnel outlet at an output end of the funnel; and
   constructing and arranging the funnel outlet to align with and couple to an elongated neck such that the material dispense tip includes a single material path between the funnel outlet and an outlet at the distal end of the neck.

* * * * *